(12) United States Patent
Penciu

(10) Patent No.: US 8,112,996 B2
(45) Date of Patent: Feb. 14, 2012

(54) SYSTEMS AND METHODS FOR COLLECTING SOLAR ENERGY FOR CONVERSION TO ELECTRICAL ENERGY WITH MULTIPLE THERMODYNAMIC ENGINES AND PIEZOELECTRIC GENERATORS

(75) Inventor: Cristian Penciu, Dallas, TX (US)

(73) Assignee: Pulsar Energy, Inc., Dallas, TX (US)

( * ) Notice: Subject to any disclaimer, the term of this patent is extended or adjusted under 35 U.S.C. 154(b) by 457 days.

(21) Appl. No.: 12/365,753

(22) Filed: Feb. 4, 2009

(65) Prior Publication Data

US 2009/0260360 A1    Oct. 22, 2009

Related U.S. Application Data

(63) Continuation-in-part of application No. 12/212,249, filed on Sep. 17, 2008, and a continuation-in-part of application No. 12/212,408, filed on Sep. 17, 2008, application No. 12/365,753, which is a continuation-in-part of application No. 12/355,390, filed on Jan. 16, 2009, now Pat. No. 7,876,028.

(60) Provisional application No. 60/993,946, filed on Sep. 17, 2007, provisional application No. 61/011,298, filed on Jan. 16, 2008, provisional application No. 61/063,508, filed on Feb. 4, 2008, provisional application No. 61/066,371, filed on Feb. 20, 2008.

(51) Int. Cl.
*B60K 16/00* (2006.01)
*B60L 8/00* (2006.01)
*F03G 6/00* (2006.01)
*F24J 2/00* (2006.01)

(52) U.S. Cl. .................... 60/641.15; 60/641.8; 126/701; 126/702

(58) Field of Classification Search .................. 60/641.8, 60/641.13, 641.14, 641.15; 126/572–713
See application file for complete search history.

(56) References Cited

U.S. PATENT DOCUMENTS

| | | | |
|---|---|---|---|
| 3,117,414 A | 1/1964 | Daniels et al. | |
| 3,182,654 A | 5/1965 | Culling | |
| 4,002,032 A | 1/1977 | Bash | |
| 4,038,972 A | 8/1977 | Orrison | |
| 4,160,523 A | 7/1979 | Stevens | |
| 4,168,696 A | 9/1979 | Kelly | |

(Continued)

OTHER PUBLICATIONS

PCT.ISA.220—International Search Report; File Reference 4902 PCT, International Application No. PCT/US09/57104, filed Sep. 16, 2009.

*Primary Examiner* — Thomas Denion
*Assistant Examiner* — Christopher Jetton
(74) *Attorney, Agent, or Firm* — Clements Bernard PLLC; Lawrence A. Baratta, Jr.; Christopher L. Bernard

(57) ABSTRACT

The present disclosure provides systems and methods for collecting and converting solar energy into electrical energy by using solar collectors with multiple closed-cycle thermodynamic engines and/or piezoelectric generators. The solar collectors are configured to collect solar energy and to distribute the collected solar energy in a pulsating manner directly into multiple closed-cycle thermodynamic engines, piezoelectric generators, and the like. The pulsating manner means that the solar energy is allowed to enter into a particular engine or generator periodically, for a predetermined period of time, similar to turning a switch ON and OFF. Advantageously, this enables more efficient use of the collected solar energy.

20 Claims, 18 Drawing Sheets

U.S. PATENT DOCUMENTS

| | | | |
|---|---|---|---|
| 4,173,123 A * | 11/1979 | Gurtler | 60/641.13 |
| 4,229,660 A * | 10/1980 | Adler | 290/2 |
| 4,271,822 A | 6/1981 | Radebold | |
| 4,353,212 A * | 10/1982 | Adler | 60/622 |
| 4,414,814 A | 11/1983 | White | |
| 4,452,047 A * | 6/1984 | Hunt et al. | 60/641.15 |
| 4,475,538 A | 10/1984 | Percival et al. | |
| 4,598,550 A * | 7/1986 | Abbott | 60/641.8 |
| 4,682,582 A | 7/1987 | Zsida | |
| 4,821,516 A | 4/1989 | Isshiki | |
| 5,089,055 A * | 2/1992 | Nakamura | 136/248 |
| 5,365,920 A | 11/1994 | Lechner | |
| 5,593,549 A | 1/1997 | Stirbl et al. | |
| 5,809,784 A | 9/1998 | Kreuter | |
| 6,080,927 A | 6/2000 | Johnson | |
| 6,700,054 B2 | 3/2004 | Cherney et al. | |
| 6,735,946 B1 | 5/2004 | Otting et al. | |
| 6,775,982 B1 | 8/2004 | Kitamura et al. | |
| 6,786,045 B2 * | 9/2004 | Letovsky | 60/641.8 |
| 6,818,818 B2 | 11/2004 | Bareis | |
| 7,227,077 B2 | 6/2007 | Kleinwachter | |
| 2006/0037606 A1 | 2/2006 | Singh | |

* cited by examiner

Top View

Side View

SYSTEMS AND METHODS FOR COLLECTING SOLAR ENERGY FOR CONVERSION TO ELECTRICAL ENERGY WITH MULTIPLE THERMODYNAMIC ENGINES AND PIEZOELECTRIC GENERATORS

CROSS-REFERENCE TO RELATED APPLICATION(S)

The present non-provisional patent application is a continuation-in-part of co-pending U.S. patent application Ser. No. 12/212,249, filed Sep. 17, 2008, and entitled "SYSTEMS AND METHODS FOR COLLECTING SOLAR ENERGY FOR CONVERSION TO ELECTRICAL ENERGY," and co-pending U.S. patent application Ser. No. 12/212,408, filed Sep. 17, 2008, and entitled "APPARATUS FOR COLLECTING SOLAR ENERGY FOR CONVERSION TO ELECTRICAL ENERGY," each of which claims priority to U.S. Provisional Patent Application Ser. No. 60/993,946, filed Sep. 17, 2007, entitled "METHOD AND APPARATUS FOR CONVERTING SOLAR ENERGY INTO ELECTRICAL ENERGY," all of which are incorporated in full by reference herein. The present non-provisional patent application is also a continuation-in-part of U.S. patent application Ser. No. 12/355,390, filed Jan. 16, 2009 now U.S. Pat. No. 7,876,028, and entitled "SYSTEMS AND METHODS FOR COLLECTING SOLAR ENERGY FOR CONVERSION TO ELECTRICAL ENERGY WITH PIEZOELECTRIC GENERATORS" which claims priority to U.S. Provisional Patent Application Ser. No. 61/011,298, filed Jan. 16, 2008, entitled "METHOD AND APPARATUS FOR CONVERTING SOLAR ENERGY INTO ELECTRICAL ENERGY USING CLOSED-CYCLE THERMODYNAMIC ENGINES AND PIEZO-ELECTRIC GENERATORS." Additionally, the present non-provisional patent application claims priority to U.S. Provisional Patent Application Ser. No. 61/063,508, filed Feb. 4, 2008, entitled "METHOD AND APPARATUS FOR CONVERTING SOLAR ENERGY INTO ELECTRICAL ENERGY USING MULTIPLE CLOSED-CYCLE THERMODYNAMIC ENGINE AND PIEZO-ELECTRIC GENERATORS," and to U.S. Provisional Patent Application Ser. No. 61/066,371, filed Feb. 20, 2008, entitled "METHOD AND APPARATUS FOR CONVERTING ELECTROMAGNETIC ENERGY INTO ELECTRIC AND THERMAL ENERGY USING A CLOSED-CYCLE THERMODYNAMIC ENGINE AND ELECTRIC GENERATOR," all of which are incorporated in full by reference herein.

FIELD OF THE INVENTION

The present invention relates generally to solar-to-electrical energy conversion. More particularly, the present invention provides systems and methods for collecting and converting solar energy into electrical energy by using solar collectors with multiple closed-cycle thermodynamic engines and/or piezoelectric generators.

BACKGROUND OF THE INVENTION

Solar energy is one of the renewable energy sources that does not pollute, it is free, and available virtually everywhere in the world. For these reasons, over the years there have been many systems and methods that attempted to utilize solar energy and convert it into other usable forms of energy such as electricity. More recently, due to perceived shortages and higher prices of fossil fuels and due to pollution concerns, the interest has increased and the pace of development of technologies that utilize alternative energy sources (such as solar) has accelerated.

There are two main techniques developed to harvest solar energy. The first technique utilizes photovoltaic solar cells to directly convert solar energy into electricity. The photovoltaic solar cells have the advantage of small size, but are expensive to manufacture and the price per watt has leveled due to the high cost of the semiconductor substrate utilized to construct the photovoltaic solar cells. There are many types of designs and materials used to make photovoltaic solar cells which affect their cost and conversion efficiency. Current commercially available solar cells typically reach a starting efficiency around 18% which drops over time. The cells produce direct current (DC) that needs to be regulated, and for higher power applications typically the DC current also needs to be converted to AC current.

The second technique utilizes the heat (infrared radiation) associated with the solar energy. Assuming that the goal is to generate electrical energy, the solar radiation gets collected, concentrated, and utilized as a heat source for various systems that convert the heat into mechanical energy, which is then converted into electrical energy. Successful machines developed to convert heat into mechanical energy can be based on thermodynamic cycles. Mechanical energy produced by these machines is further converted into electrical energy by using rotating generators or linear generators. For example, in the case of a Stirling engine, heat (which can come from any heat source) is applied at one end of the engine and cooling is provided at a different location. The working fluid (gas), which is sealed inside the engine, goes through a cycle of heating (expansion) and cooling (contraction). The cycle forces a piston inside the engine to move and produce mechanical energy. When the heat source is solar, successful engine designs use an intermediate medium such as molten salt to more uniformly distribute the heat around the outside surface of the heating end of the engine.

With respect to the second technique, problems arise when the surface of the engine is exposed to large temperature gradients due to close proximity of the heat and cooling sources on the surface of the engine. For example, conventional engines can see extreme temperatures from day to night and along the length of the engine body with temperatures ranging from over 1000 degrees Fahrenheit to room temperature across the engine body. Disadvantageously, these types of engines face difficult material problems such as weld joint cracking and loss of material properties due to thermal cycling over time. Also, there are losses associated with heat radiation from the hot end of these types of engines leading to inefficiency.

Piezoelectricity is the ability of some materials (notably crystals and certain ceramics) to generate an electric potential in response to applied mechanical stress. This can take the form of a separation of electric charge across the crystal lattice. If the material is not short-circuited, the applied charge induces a voltage across the material. Direct piezoelectricity of some substances like quartz can generate potential differences of thousands of volts.

BRIEF SUMMARY OF THE INVENTION

In various exemplary embodiments, the present invention provides systems and methods for collecting and converting solar energy into electrical energy by using solar collectors with multiple closed-cycle thermodynamic engines and/or piezoelectric generators. The solar collectors are configured to collect solar energy and to distribute the collected solar energy in a pulsating manner directly into multiple closed-cycle thermodynamic engines, piezoelectric generators, and the like. The pulsating manner means that the solar energy is allowed to enter into a particular engine or generator periodically, for a predetermined period of time, similar to turning a switch ON and OFF. Advantageously, this enables more efficient use of the collected solar energy.

In an exemplary embodiment of the present invention, a solar array distribution system includes a solar energy collector; a distribution mechanism located at an output of the solar collector; and a controller communicatively coupled to the distribution mechanism, wherein the controller is configured to control the distribution mechanism to provide collected solar energy from the solar energy collector to two or more devices in a pulsating manner. The pulsating manner includes providing the collected solar energy into each of the two or more devices for a time period corresponding to a heating cycle for the each of the two or more devices. The time period includes one of a predetermined value and an adaptive setting based on operational conditions associated with the solar energy collector and the two or more devices. Optionally, the distribution mechanism includes an optical switch located in free space at an output of the solar energy collector; and one or more reflective surfaces located in free space, wherein each of the one or more reflective surfaces is positioned substantially adjacent to each of the two or more devices; wherein the controller is configured to control the optical switch and the one or more reflective surfaces to provide the collected solar energy through optically transparent windows on each of the two or more devices. The optical switch can include one of an oscillating reflective surface, a microelectromechanical system, and a refractive switch, and the one or more reflective surfaces each include one of a flat and a curved surface configured to move with the optical switch to minimize the loss of solar energy during the transient part of the optical switch movement. Alternatively, the distribution mechanism includes a plurality of light guides connected to the output of the solar collector; one or more splitters in the plurality of light guides; and a termination on each of the plurality of light guides, wherein the termination is located in a heating chamber of each of the one or more devices. The plurality of light guides include any of FEP, glass, fluorinated polymers, and a thin tube filled with a fluid; and the termination includes a material transparent to infrared radiation and resistant to high temperatures inside the heating chamber. Additionally, the including a reflective portion and a pass through portion; wherein the distribution mechanism is configured to rotate the plurality of rotatable reflective disks to distribute the collected solar energy into each of the two or more devices. The two or more devices each can include any of a generator and a thermodynamic engine; wherein each of the two or more devices include an offset heating cycle from the other two or more devices. The pulsating manner further includes removing heat with a heat removing device from each of the heating chambers not receiving collected solar energy through the distribution mechanism. Optionally, the two or more devices include a piezoelectric generator; wherein the heat removing device includes a plurality of heat exchangers disposed around the heating chamber; and wherein the plurality of heat exchanges include tubes with cooling water. Alternatively, the two or more devices include a closed-cycle thermodynamic; and wherein the heat removing device includes a plurality of heat exchangers disposed around the heating chamber.

In another exemplary embodiment of the present invention, a solar array includes a plurality of solar collectors; an optical switch located in free space at an output of each of the plurality of solar collectors; one or more reflective surfaces located in free space, wherein each of the one or more reflective surfaces is positioned substantially adjacent to two or more devices; a controller communicatively coupled to the optical switch and the one or more reflective surfaces, wherein the controller is configured to control the optical switch and the one or more reflective surfaces to provide collected solar energy from the plurality of solar collectors to the two or more devices in a pulsating manner. The pulsating manner includes providing the collected solar energy into each of the two or more devices for a time period corresponding to a heating cycle for the each of the two or more devices. The time period includes one of a predetermined value and an adaptive setting based on operational conditions associated with the solar energy collector and the two or more devices. Optionally, the two or more devices each include a piezoelectric generator.

In yet another exemplary embodiment of the present invention, a solar energy conversion method including collecting solar energy; directing the collected solar energy into a first device for a first time period; generating electricity with the first device; repeating the directing and generating steps for one or more devices each for additional time periods each corresponding to the one or more devices; and cooling one or more of the first device and the one or more devices while collected energy is being directed into another device. The solar energy conversion further includes adapting the first time period and the additional time periods based on operational conditions. Optionally, the first device and the one or more devices include piezoelectric generators. The directing step can also be performed by an optical switch.

BRIEF DESCRIPTION OF THE DRAWINGS

The present invention is illustrated and described herein with reference to the various drawings, in which like reference numbers denote like system components and/or method steps, respectively, and in which.

DETAILED DESCRIPTION OF THE INVENTION

In various exemplary embodiments, the present invention provides systems and methods for collecting and converting solar energy into electrical energy by using solar collectors with multiple closed-cycle thermodynamic engines and/or piezoelectric generators. The solar collectors are configured to collect solar energy and to distribute the collected solar energy in a pulsating manner directly into multiple closed-cycle thermodynamic engines, piezoelectric generators, and the like. The pulsating manner means that the solar energy is allowed to enter into a particular engine or generator periodically, for a predetermined period of time, similar to turning a switch ON and OFF. Advantageously, this enables more efficient use of the collected solar energy.

The present invention includes solar collectors that concentrate solar energy and mechanisms for transporting and transferring the concentrated solar energy directly into multiple engines and/or generators without heating the outside surface of the engines and/or generators. Additionally, the present invention includes mechanisms to direct solar energy into each of the multiple engines and/or generators to increase overall system efficiency by maximizing the use of collected solar energy. Advantageously, the delivery system of the present invention avoids heating an outside surface of the multiple engines and/or generators as is done in conventional designs, provides a closed design to protect the collectors, and maximizes efficiency through multiple engines and/or generators and optical splitters.

Figure 1:
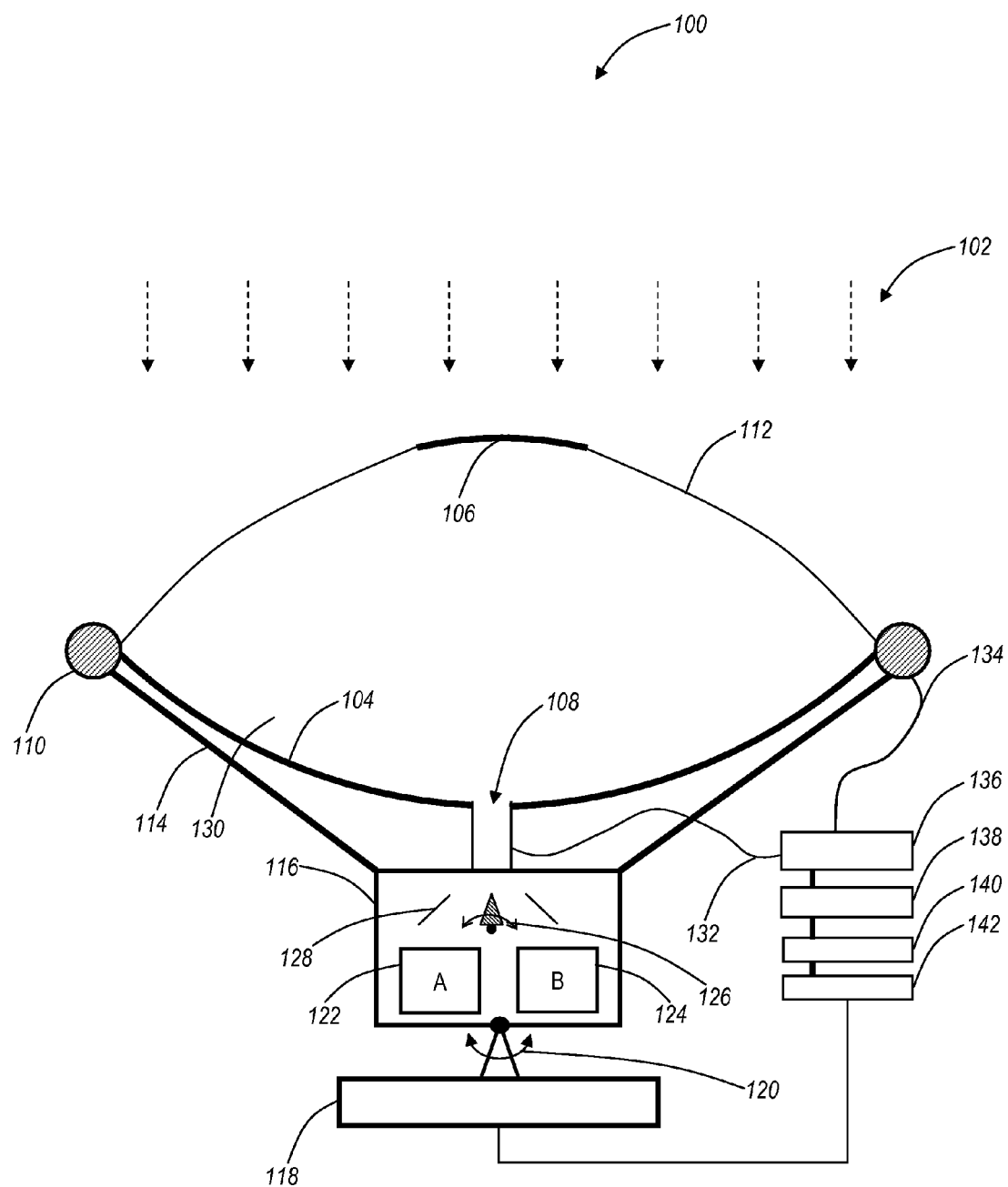
FIG. 1 is system schematic including a dual-surface reflector for collecting and concentrating solar energy according to an exemplary embodiment of the present invention.

Referring to FIG. 1, a dual-surface reflector 100 is illustrated for collecting and concentrating solar energy 102 according to an exemplary embodiment of the present invention. The dual-surfaces on the dual-surface reflector 100 include a primary reflector 104 and a secondary reflector 106. The reflectors 104, 106 can be in a parabolic shape, a spherical shape, and the like. Also, the secondary reflector 106 can be concave or convex depending on the positioning of the secondary reflector 106 relative to the primary reflector 104. The primary reflector 104 is pointed towards the solar energy 102, and the secondary reflector 106 is located above the primary reflector 104. The primary reflector 104 is configured to reflect the solar energy 102 to the secondary reflector 106 which in turn concentrates the solar energy 102 through an opening 108 at a center of the primary reflector 104.

An outer perimeter support ring 110 is disposed around the edges of the primary reflector 104 to maintain the shape of the primary reflector 104 and to anchor in place the primary reflector 104. A transparent and flexible material 112 connects to the primary reflector 104 and to the support ring 110 to hold the secondary reflector 106 in place. The transparent and flexible material 112 is configured to allow the solar energy 102 to pass through, and can be constructed from a material that is optically transparent in the infrared region, such as a material in the Teflon® family of products, for example, fluorinated ethylene propylene (FEP) or the like. The transparent and flexible material 112 provides a closed design of the dual-surface reflector 100. Advantageously, the transparent and flexible material 112 can seal the dual-surface reflector 100 from the elements, i.e. wind, airborne particles, dirt, bird droppings, etc. This prevents deterioration of the reflectors 104, 106 and reduces maintenance with respect to cleaning the reflectors 104, 106.

A support member 114 can be disposed to the outer perimeter support ring 110 and a base 116. The base 116 can connect to a tracking mechanism 118 through a rotatable member 120. The tracking mechanism 118 is configured to continuously point the reflectors 104, 106 towards the sun by initiating a rotation of the rotatable member 120 to rotate the base 116, the support member 114 and the support ring 110. For example, the tracking mechanism 118 can include a microcontroller or the like can rotate according to location (e.g., an integrated Global Positioning Satellite (GPS) receiver, preprogrammed location, or the like), date, and time or the like. Additionally, the tracking mechanism 118 can include feedback from sensors that detect the position of the sun.

The base 116 can include one or more motors and electric generators 122, 124. The opening 108 is connected to the base 116 to provide concentrated solar energy from the reflectors 104, 106 to the one or more motors and electric generators 122, 124. For a single motor and electric generator 122, the motor and electric generator 122 is positioned to allow the concentrated solar energy to enter working fluid (e.g., a liquid, a gas, or a phase change substance) without heating an outside surface of the single motor and electric generator 122. The one or more motors and electric generators 122, 124 can include piezoelectric generators, closed-cycle thermodynamic engines, or variations of these.

FIG. 1 illustrates an exemplary embodiment with two of the motors and electric generators 122, 124. This exemplary embodiment includes an optical switch 126 and reflecting surfaces 128 to direct the concentrated solar energy into each of the motors and electric generators 122, 124. Those of ordinary skill in the art will recognize that the base 116 can include more than two of the motors and electric generators 122, 124 with a corresponding optical switch 126 and reflecting surfaces 128 to concentrate solar energy into each of the more than two of the motors and electric generators 122, 124. The optical switch 126 is configured to provide concentrated solar energy for predetermined intervals into each of the motors and electric generators 122, 124.

Advantageously, the optical switch 126 enables the dual-surface reflector 100 to input energy into each of the motors and electric generators 122, 124 in a pulsating manner only when needed and for a duration of time that is completely controllable. This enables the dual-surface reflector 100 to avoid wasting collected solar energy, i.e. the optical switch 126 enables the collected energy to be used in each of the motors and electric generators 122, 124 as needed. For example, the optical switch 126 can be configured to direct collected solar energy into a heating chamber of each of the motors and electric generators 122, 124 only during a heating cycle. The motors and electric generators 122, 124 each have offset heating cycles to allow all collected solar energy to be used, i.e. the optical switch 126 cycles between each of the motors and electric generators 122, 124 for their individual heating cycles.

In an exemplary embodiment, the dual-surface reflector 100 can include inflatable components, such as an inflatable portion 130 between the primary reflector 104 and the secondary reflector 106 and in the outer perimeter support ring 110. Air lines 132, 134 can be connected to the inflatable portion 130 and the outer perimeter support ring 110, respectively, to allow inflation through a valve 136, a pressure monitor 138, and an air pump 140. Additionally, a microcontroller 142 can be operably connected to the air pump 140, the pressure monitor 138, the valve 136, the tracking mechanism 118, etc. The microcontroller 142 can provide various control and monitoring functions of the dual-surface reflector 100.

Collectively, the components 136, 138, 140, 142 can be located within the base 116, attached to the base 116, in the tracking mechanism 118, external to the base 116 and the tracking mechanism 118, etc. The valve 136 can include multiple valves, such as, for example, an OFF valve, an ON/OFF line 132/134 valve, an OFF/ON ON/OFF line 132/134 valve, and so on for additional lines as needed, or the valve 136 can include multiple individual ON/OFF valves controlled by the microcontroller 142.

The inflatable components can be deflated and stored, such as in a compartment of the base 114. For example, the inflatable components could be stored in inclement weather, high winds, and the like to protect the inflatable components from damage. The microcontroller 142 can be connected to sensors which provide various feedback regarding current conditions, such as wind speed and the like. The microcontroller 142 can be configured to automatically deflate the inflatable components responsive to high winds, for example.

The support member 114 and the outer perimeter support ring 110, collectively, are configured to maintain the desired shape of the primary reflector 104, the secondary reflector 106, and the transparent and flexible material 112. The pressure monitor 138 is configured to provide feedback to the microcontroller 142 about the air pressure in the inflatable portion 130 and the outer perimeter support ring 110. The dual-surface reflector 100 can also include controllable relief pressure valves (not shown) to enable the release of air to deflate the dual-surface reflector 100. The transparent and flexible material 112 can form a closed space 130 which is inflated through the air line 132 to provide a shape of the secondary reflector 106, i.e. air is included in the interior of the dual-surface reflector 100 formed by the transparent and flexible material 112, the secondary reflector 106 and the primary reflector 104.

Advantageously, the inflatable components provide low cost and low weight. For example, the inflatable components can reduce the load requirements to support the dual-surface reflector 100, such as on a roof, for example. Also, the inflatable components can be transported more efficiently (due to the low cost and ability to deflate) and stored when not in use (in inclement weather, for example).

In another exemplary embodiment, the primary reflector 104, the support member 114, the outer perimeter support ring 110, the transparent and flexible material 112, etc. could be constructed through rigid materials which maintain shape. In this configuration, the components 136, 138, 140 are not required. The microcontroller 142 could be used in this configuration for control of the tracking mechanism 118 and general operations of the dual-surface reflector 100.

In both exemplary embodiments of the dual-surface reflector 100, the microcontroller 142 can include an external interface, such as through a network connection or direct connection, to enable user control of the dual-surface reflector 100. For example, the microcontroller 142 can include a user interface (UI) to enable custom settings.

The primary reflector 104 can be made from a flexible material such as a polymer (FEP) that is metalized with a thin, highly reflective metal layer that can be followed by additional coatings that protect and create high reflectance in the infrared region. Some of the metals that can be used for depositing a thin reflector layer on the polymer substrate material of the inflatable collector can include gold, aluminum, silver, or dielectric materials. Preferably, the surface of the primary reflector 104 is metalized and coated such that it is protected from contamination, scratching, weather, or other potentially damaging elements.

The secondary reflector 106 surface can be made in the same manner as the primary reflector 104 with the reflecting metal layer being deposited onto the inside surface of the secondary reflector 106. For improved performance, the secondary reflector 106 can be made out of a rigid material with a high precision reflective surface shape. In this case the, the secondary reflector can be directly attached to the transparent and flexible material 112 or be sealed to it (impermeable to air) around the perimeter of the secondary reflector 106. Both the primary reflector 104 and the secondary reflector 106 can utilize techniques to increase surface reflectivity (such as multi-layers) to almost 100%.

The dual-surface reflector 100 operates by receiving the solar energy 102 through solar radiation through the transparent and flexible material 112, the solar radiation reflects from the primary reflector 104 onto the secondary reflector 106 which collimates or slightly focuses the solar radiation towards the opening 108. One or more engines (described in FIG. 5) can be located at the opening 108 to receive the concentrated solar radiation (i.e., using the optical switch 126 and the reflectors 128 to enable multiple engines). The collimated or focused solar radiation from the secondary reflector 106 enters through optically transparent window on the engines towards a hot end (solar energy absorber) of a thermodynamic engine.

Advantageously, the dual-surface reflector 100 focuses the solar energy 102 and directs it into each of the motors and electric generators 122, 124 for their individual heating cycles in a manner that avoids heating engine components other than the solar energy absorber element in the heating chamber of the motors and electric generators 122, 124. Specifically, the opening 108 extends to the optical switch 126 which directs the concentrated solar energy directly into each of the motors and electric generators 122, 124 through a transparent window of the heating chamber. The materials forming the opening 108 and the transparent window include materials with absorption substantially close to zero for infrared radiation.

The dual-surface reflector 100 includes a large volume, and is preferably suitable for open spaces. For example, the dual-surface reflector 100 could be utilized in open-space solar farms for power plants, farms, etc. In an exemplary embodiment, the dual-surface reflector 100 could be four to six meters in diameter. Alternatively, the dual-surface reflector 100 could be a reduced size for individual home-use. Advantageously, the light weight of the inflatable components could enable use of the dual-surface reflector 100 on a roof. For example, a home-based dual-surface reflector 100 could be 0.1 to one meters in diameter. Also, the reduced cost could enable the use of the dual-surface reflector 100 as a backup generator, for example.

Figure 2:
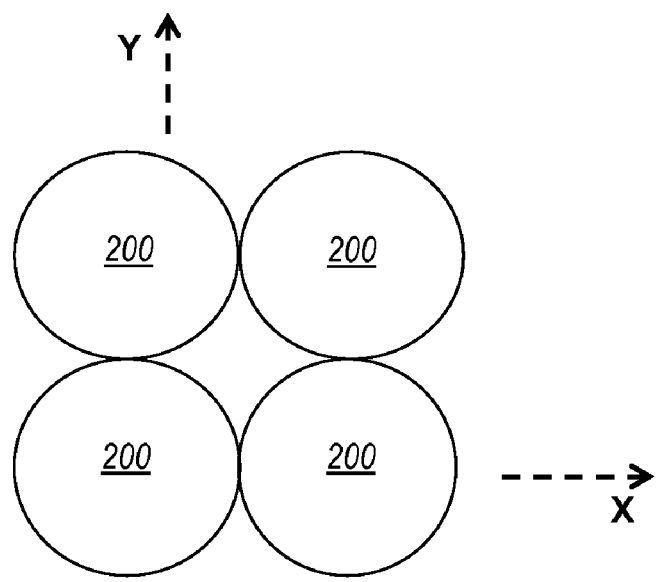
FIG. 2 are multiple low-profile solar collectors for providing a flatter and compact low-profile arrangement according to an exemplary embodiment of the present invention.
Figure 2:
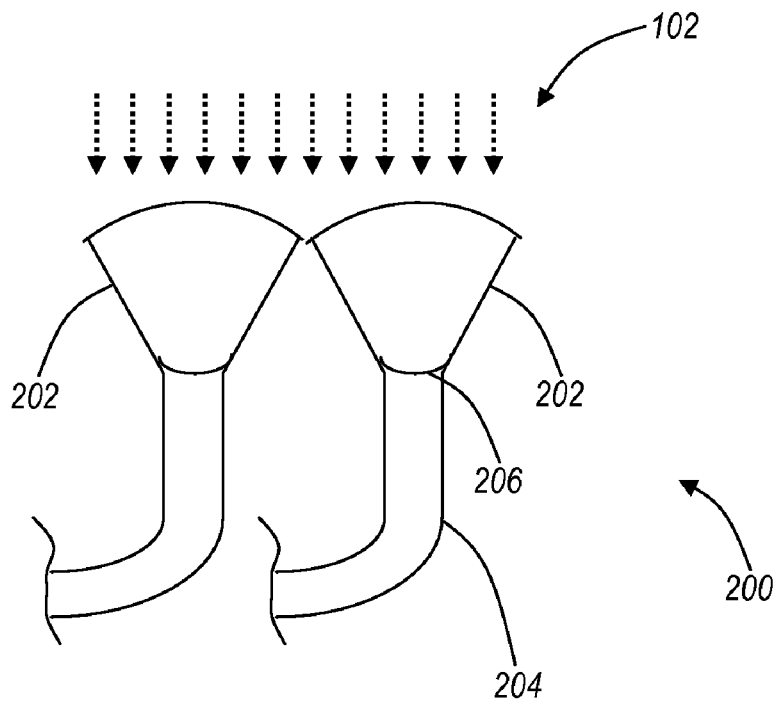
Figure 4:
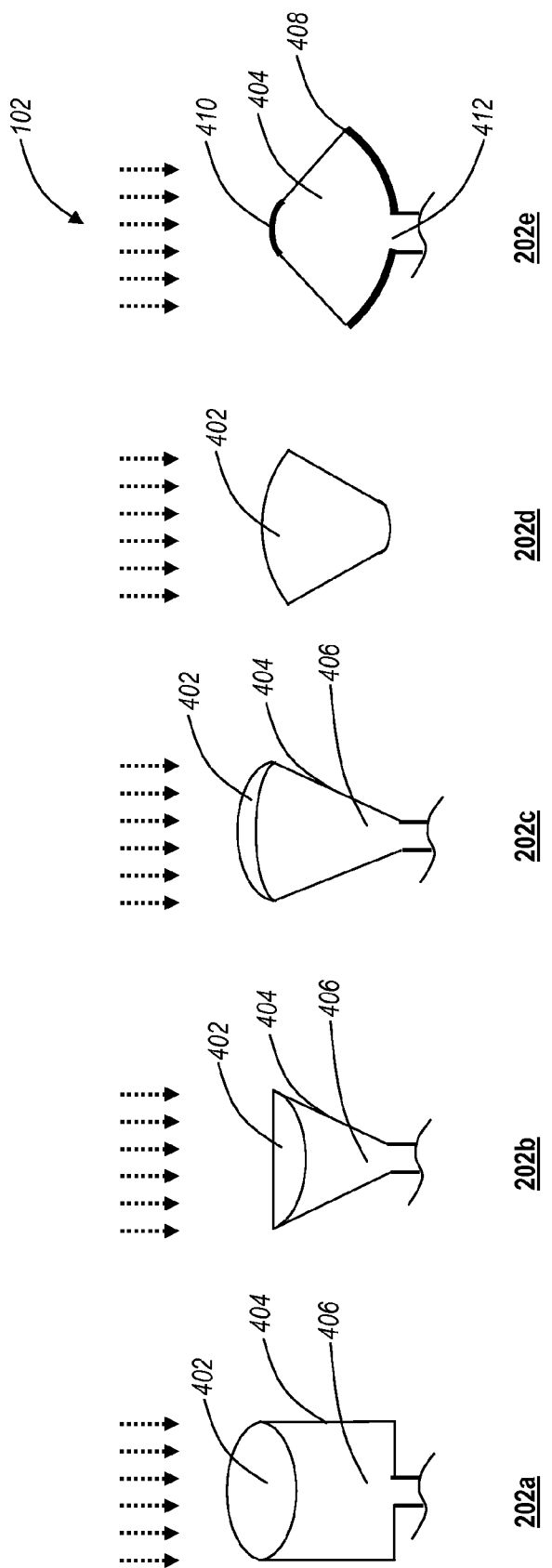
FIG. 4 is a diagram of various designs for a focusing/collimating element according to an exemplary embodiment of the present invention.

Referring to FIG. 2, multiple solar collectors 200 are illustrated for providing a flatter and compact arrangement, i.e. a low-profile design, according to an exemplary embodiment of the present invention. FIG. 2 illustrates a top view and a side view of the multiple solar collectors 200. In the top view, the multiple solar collectors 200 can be arranged side-by-side along an x- and y-axis. Each of the solar collectors 200 includes a focusing/collimating element 202 which is configured to concentrate solar radiation 102 into a corresponding light guide 204. The focusing/collimating element 202 is illustrated in FIG. 2 with an exemplary profile, and additional exemplary profile shapes are illustrated in FIG. 4.

The focusing/collimating element 202 focuses the solar radiation 102 into a cone of light with a numerical aperture smaller than the numerical aperture of the light guide 204. The focusing/collimating element 202 can be made out of a material transparent to infrared solar radiation, such as FEP. The focusing/collimating element 202 can be a solid material or hollow with a flexible skin that allows the element 202 to be formed by inflating it with a gas. Forming the element though inflation provides weight and material costs advantages.

The light guides 204 can be constructed out of a material that is optically transparent in the infrared region, such as FEP, glass, or other fluorinated polymers in the Teflon® family, or the light guides 204 can be made out of a thin tube (e.g., FEP) filled with a fluid, such as Germanium tetrachloride or Carbon tetrachloride, that is transparent to infrared radiation. Advantageously, the light guides 204 include a material selected so that it has close to zero absorption in the wavelengths of the solar energy 102. The tube material must have a higher index of refraction than the fluid inside it in order to create a step index light guide that allows propagation of the concentrated solar radiation. The array of the multiple solar collectors 200 can extend in the X and Y direction as needed to collect more solar energy.

The focusing/collimating element 202, the light guide 204 and the interface 206 can be rotatably attached to a solar tracking mechanism (not shown). The tracking mechanism is configured to ensure the focusing/collimating element 202 continuously points toward the sun. A microcontroller (not shown) similar to the microcontroller 142 in FIG. 1 can control the tracking mechanism along with other functions of the multiple solar collectors 200. The tracking mechanism can individually point each of the focusing/collimating elements 202 towards the Sun, or alternatively, a group tracking mechanism (not shown) can align a group of elements 202 together.

Figure 3:
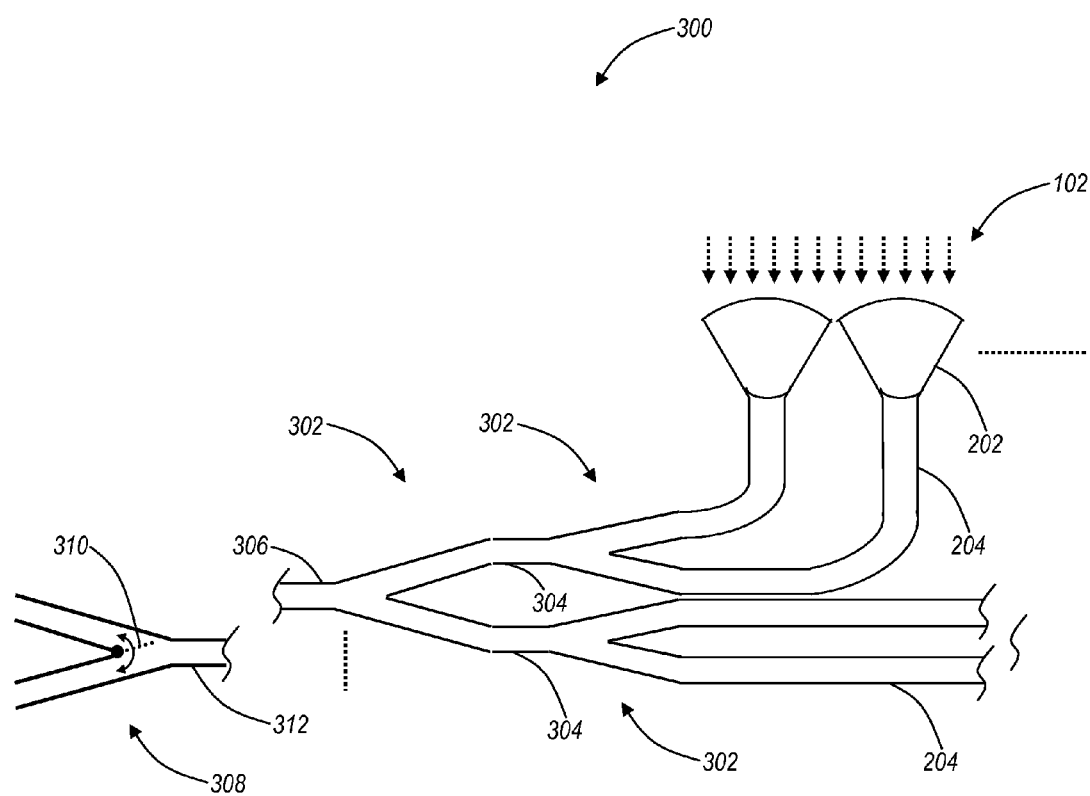
FIG. 3 is a mechanism for combining solar radiation from multiple low-profile solar collectors through light guides according to an exemplary embodiment of the present invention.

Referring to FIG. 3, a mechanism 300 is illustrated for combining solar radiation 102 from the multiple light guides 204 in FIG. 2 according to an exemplary embodiment of the present invention. The multiple light guides 204 are configured to receive concentrated solar radiation from the focusing/collimating elements 202 and to guide it and release it inside a hot end of multiple engines and/or generators. Optical couplers 302 can be utilized to combine multiple light guides 204 into a single output 304. For example, FIG. 3 illustrates four total light guides 204 combined into a single output 306 through a total of three cascaded optical couplers 302. Those of ordinary skill in the art will recognize that various configurations of optical couplers 302 can be utilized to combine an arbitrary number of light guides 204. The optical couplers 204 which are deployed in a tree configuration in FIG. 3 reduce the number of light 204 guides reaching the engines and/or generators. Alternatively, each light guide 204 could be directed separately into the engines and/or generators.

An optical splitter 308 and an optical switch 310 can also be included in the optical path (illustrated connected to a light guide 312 which includes a combination of all of the light guides 204) at an optimum location along each light guide 204 leading to the engines and/or generators. The optical splitter 308 and optical switch 310 permit pulsation of the concentrated solar energy into one or more piezoelectric generators. Each branch (e.g., two or more branches) of the optical splitter 308 leads to a different engine or generator. The optical switch 310 sequentially directs the concentrated solar energy traveling along the light guide 312 into different arms of the optical splitter 308. For example, the engines and/or generators can include offset heating cycles with the optical splitter 308 and the optical switch 310 directing solar energy 102 into each engine/generator at its corresponding heating cycle. Advantageously, this improves efficiency ensuring that collected solar energy 102 is not wasted (as would occur if there was a single engine because the single engine only requires the energy during the heating cycle).

The optical switch 310 can be integrated into the optical splitter 308 as indicated in FIG. 3 or it can exist independently in which case the optical splitter 308 could be eliminated and the optical switch 310 can have the configuration presented in FIG. 1 (i.e., optical switch 126 and reflecting surfaces 128). In the case where the optical switch 310 is independent of the light guide 312, the light guide termination is designed to collimate the light directed towards the optical switch 310. The selection of the optimum points where the optical splitters 308 are inserted depends on the power handling ability of the optical switch 310 and on economic factors. For example, if the optical switch 310 is inserted in the optical path closer to the engines and/or generators, then fewer switches 310 and shorter light guides 204 are needed, but the optical switches 310 need to be able to handle higher light intensities.

Referring to FIG. 4, various designs are illustrated for the focusing/collimating element 202a-202e according to an exemplary embodiment of the present invention. The focusing/collimating element 202a, 202b, 202c each include an optically transparent solid material 402 shaped in either a bi-convex (element 202a), a plano-convex (element 202b), and a meniscus form (element 202c), all of which have the purpose to focus the incoming solar energy 102. Additionally, each of the elements 202a, 202b, 202c also include a flexible "skin" material 404 that together with the optically transparent solid material 402 form an inflatable structure 406 which can be inflated with air or a different gas. The air/gas pressure in the inflatable structure 406 can be dynamically controlled to maintain an optimum focal distance between the solid material 402 and the engines and/or generators. The optically transparent solid material 402 and the flexible "skin" material 404 are made out of a material transparent to visible and infrared solar radiation, such as FEP, for example. The focusing/collimating element 202d is a solid convex focusing element constructed entirely of the optically transparent solid material 402.

The focusing/collimating element 202e includes an inflatable dual reflector including a primary reflecting surface 408 and a smaller secondary reflecting surface 410 inside an inflatable structure 406. The primary reflecting surface 408 and the secondary reflecting surface 410 are configured to collectively concentrate the solar radiation 102 into an opening 412 that leads to the light guide 204. Both reflecting surfaces 408, 410 can be rigid or flexible such as metalized films or only the secondary reflector 410 can be made out of a rigid material with a high precision reflective surface shape. In this case, the secondary reflector 410 can be directly attached to the transparent material 404 or can be sealed to it (impermeable to air) around the perimeter of the secondary reflector 410. Some of the metals that can be used for metalizing a thin reflector layer on the polymer substrate material of the inflatable collector can include gold, aluminum, silver, or dielectric materials. The preferred surface to be metalized is the inside of the inflatable solar collector such that it is protected from contamination, scratching, weather, or other potentially damaging elements.

Techniques to increase surface reflectivity (such as multi layer dielectric coatings) to almost 100% can be utilized. Again, the air/gas pressure can be dynamically controlled, based on feedback from pressure sensors monitoring the inside pressure of the inflatable focusing element, to maintain the optimum focal distance. All transparent materials through which solar radiation and concentrated solar radiation passes through can have their surfaces covered with broad band anti-reflective coatings in order to maximize light transmission. The designs of the focusing elements 202 presented in FIG. 3 are for illustration purposes and those of ordinary skill in the art will recognize other designs are possible that would meet the purpose and functionality of the focusing elements 202.

The multiple solar collectors 200 can be utilized in buildings, such as office buildings, homes, etc. For example, multiple focusing/collimating elements 202 can be placed on a roof with the light guides 204 extending into the building towards a service area, basement, etc. to the engines and/or generators. Additionally, the light guides 204 heat up very little based upon their material construction. Advantageously, the low profile design of the solar collectors 200 enables roof placement and the light guides enable a separate engine location within a building.

Figure 5A:
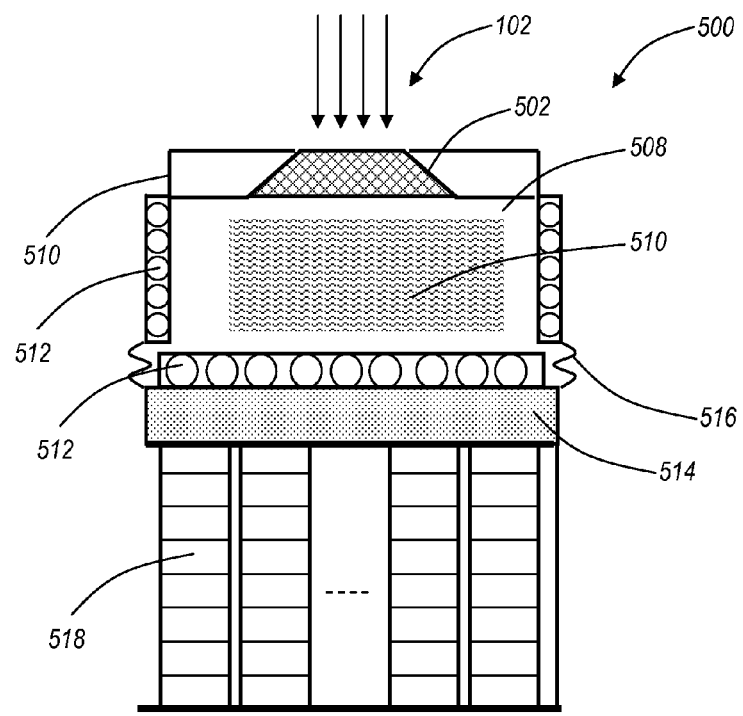
FIGS. 5A and 5B are partial cross-sectional views of a piezoelectric generator according to an exemplary embodiment of the present invention.
Figure 5B:
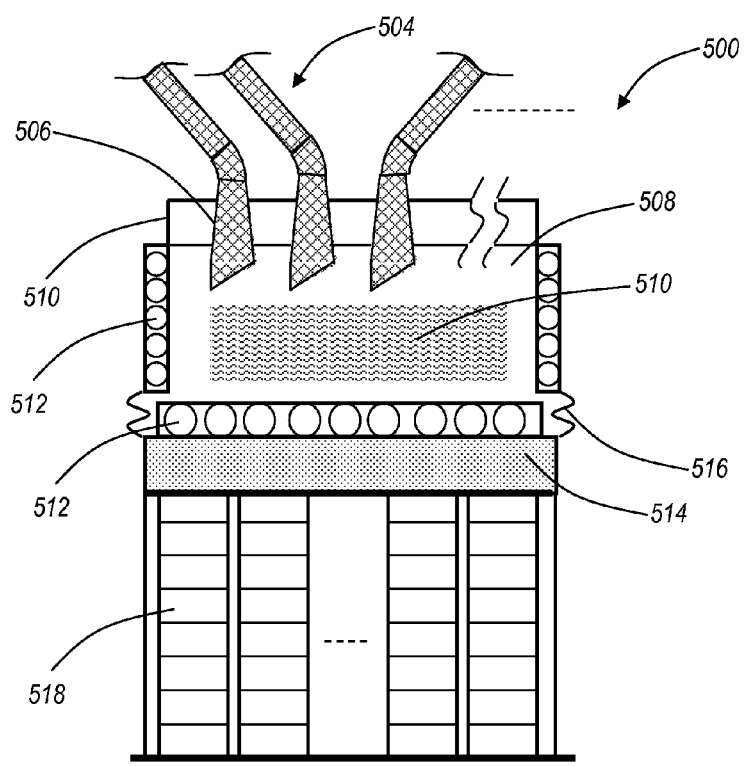

Referring to FIGS. 5A and 5B, a partial cross-sectional view illustrates a piezoelectric generator 500 according to an exemplary embodiment of the present invention. FIG. 5A illustrates an exemplary embodiment where concentrated solar energy 102 travels through free space to enter the generator 500 through an optically transparent window 502. Also, multiple optically transparent windows 502 could be utilized. The optically transparent window 502 is made out of a material transparent to infrared radiation, such as sapphire, fused silica or the like. The shape of the optically transparent window 502 is such that it facilitates sealing of working fluid inside the generator 500 and reduction of back reflection. FIG. 5A shows a trapezoidal cross section of the optically transparent window 502 as an exemplary embodiment. The optically transparent window 502 can be disposed at an end of the opening 108 or placed adjacent to the reflecting surfaces 128 of the dual-surface reflector 100 in FIG. 1.

FIG. 5B illustrates an exemplary embodiment where concentrated solar radiation enters the generator 500 through a plurality of light guides 504. Each of the light guides 504 includes a termination 506 that is made out of material transparent to infrared radiation and that is also resistant to the high temperatures inside the generator 500. The shape of termination 506 facilitates sealing of working fluid inside the generator 506. FIG. 5B shows a trapezoidal cross section of the termination 506. The termination 506 has an angled tip inside the generator 500 that minimizes back reflection inside the light guide 504 and also minimizes coupling back into the light guide 506 of radiation from the generator 500. The termination 506 includes a very hard material with good optical properties able to withstand high temperatures. The plurality of light guides 504 can connect to the solar collectors 200 in FIGS. 2-4. Additionally, the generator 500 can include fewer light guides 504 than solar collectors 200 utilizing the mechanism 300 in FIG. 3 to combine light guides 204.

In both FIGS. 5A and 5B, the optically transparent window 502 and the plurality of light guides 504 transfer concentrated solar energy directly into a heat chamber 508 of the generator 500. Advantageously, this direct transfer provides a lower temperature of the generator 500 and reduced thermal stress on a generator body 510 of the generator 500. This leads to longer generator 500 life, better reliability, increased efficiency, and the like.

Additionally, the optically transparent window 502 and the plurality of light guides 504 can be configured to transfer the solar energy in a pulsating manner. The pulsating manner means that the solar energy is allowed to enter into the chamber 508 of the generator 500 periodically, for a predetermined period of time, similar to turning a switch ON and OFF. During the OFF period for a particular generator 500, the solar energy is directed into a second, or third, or other generator 500 in a rotating, periodical fashion. In this way, all the energy from the collector is utilized. Also, during the OFF period for a particular generator 500, heat is removed from working fluid 510 as part of the thermodynamic cycle. An advantage of pulsating the energy is that solar energy is added to the working fluid 510 in a controlled manner only at the desired time.

Transferring the concentrated solar energy directly into the heat chamber 508 of the generator 500 provides great benefits. The generator body 510 has a lower temperature and the thermal stress and thermal aging in the body 510 is reduced. The chamber 508 can be surrounded by heat removing elements 512 such as any type of heat exchanger. The heat exchanger can actually be located inside the chamber 508 to maximize the rate of heat transfer and prevent the walls of the generator 500 from heating up excessively. In an exemplary embodiment, the heat removing elements 512 can include tubes with circulating water being used to remove heat. The heat extracted into the cooling water can be dissipated into the air through another heat exchanger or can be used as a heat source for heating, for example, household water.

Advantageously, inserting the solar energy directly into the working fluid 510 in a pulsating manner can improve the efficiency of the generator 500 because the outside temperature of the hot end of the generator 500 can be greatly reduced and therefore the radiated heat loss is decreased. The working fluid 510 can be a gas, typically pressurized, steam, a phase change material, or any other working fluid utilized in closed-cycle thermodynamic engines. The working fluid 510 can include an energy absorbing material that is designed to have a large surface area and is made out of a material that absorbs infrared radiation and that can efficiently release it to the working fluid. Such materials include graphite or other type of carbon based material, a suitable metal, or a metal oxide. The energy absorber can be also include carbon nano particles or other nano size particles uniformly distributed and suspended in the working fluid 510.

A bottom portion 514 of the generator 500 and the heat chamber 510 are attached in a sealed manner through a flexible bellow section 516 that allows the bottom portion 514 to move when the pressure in the heat chamber 510 increases. As a result, the stacks of piezoelectric elements 518 are compressed and a voltage is generated. The piezoelectric elements 518 can be connected in series or parallel (or combination of series and parallel) to generate the desired voltage and current. The electrical energy can be distributed for use or stored for future use.

The generator 500 is shown for illustration purposes. Those of ordinary skill in the art will recognize that the dual-surface reflector 100 and the multiple solar collectors 200 can be utilized to concentrate and directly deliver solar energy into any type of generator.

Advantageously, the designs described herein enable distributed electrical energy generation from a few kWs to 10's of kW per unit at a low cost. The present invention can directly generate Alternating Current (AC) electricity without a need for inverters. Also, the present invention can provide heat output which can be used, for example, for space heating, water heating, air conditioning, micro desalination plants, and the like. The present invention provides low installation costs and low overall maintenance costs. Additionally, the present invention can enable a modular design, such as adding additional solar collectors as needed to scale energy generation.

Figure 6A:
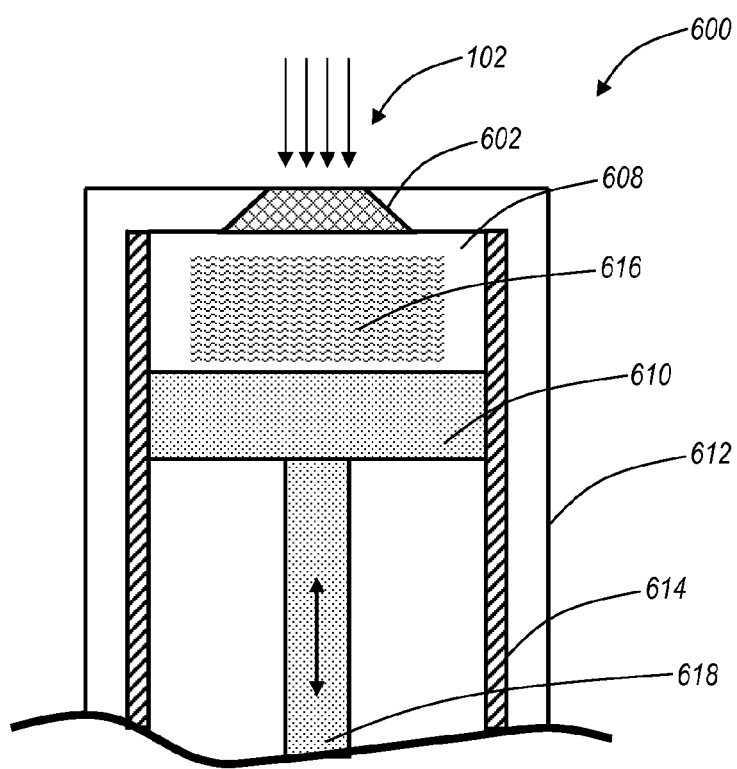
FIGS. 6A and 6B are partial cross-sectional views of a thermodynamic closed-cycle based engine according to an exemplary embodiment of the present invention.
Figure 6B:
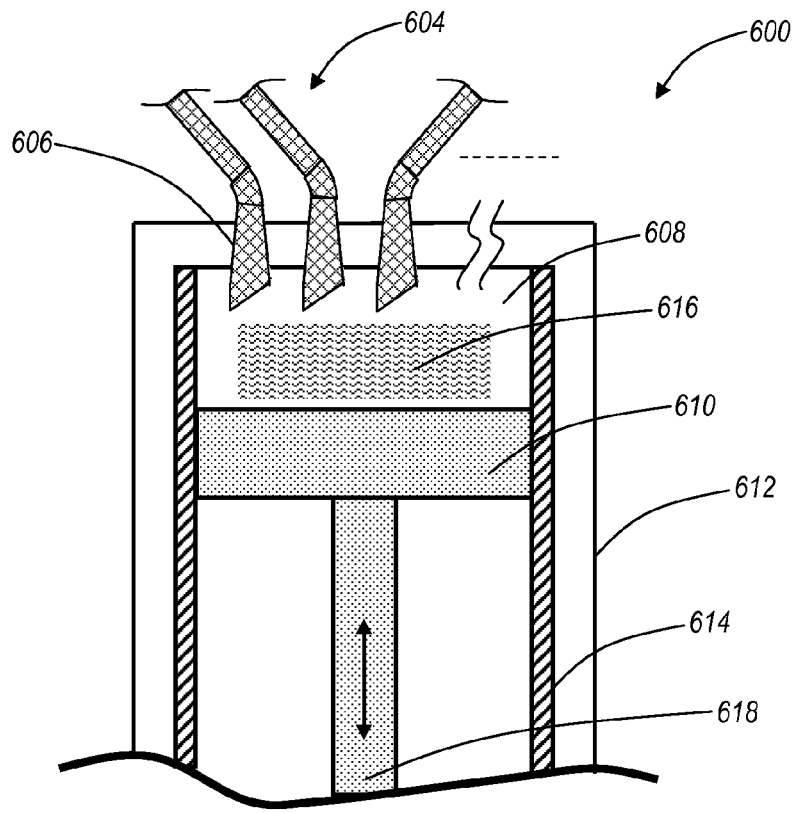

Referring to FIGS. 6A and 6B, a partial cross-sectional view illustrates a closed-cycle thermodynamic based engine 600 according to an exemplary embodiment of the present invention. FIG. 6A illustrates an exemplary embodiment where concentrated solar energy 102 travels through free space to enter the engine 600 through an optically transparent window 602. Also, multiple optically transparent windows 602 could be utilized. The optically transparent window 602 is made out of a material transparent to infrared radiation, such as sapphire, fused silica or the like. The shape of the optically transparent window 602 is such that it facilitates sealing of working fluid inside the engine 600 and reduction of back reflection. FIG. 6A shows a trapezoidal cross section of the optically transparent window 602 as an exemplary embodiment. The optically transparent window 602 can be disposed at an end of the opening 108 or placed adjacent to the reflecting surfaces 128 of the dual-surface reflector 100 in FIG. 1.

FIG. 6B illustrates an exemplary embodiment where concentrated solar radiation enters the engine 600 through a plurality of light guides 604. Each of the light guides 604 includes a termination 606 that is made out of material transparent to infrared radiation and that is also resistant to the high temperatures inside the engine 600. The shape of termination 606 facilitates sealing of working fluid inside the engine 606. FIG. 6B shows a trapezoidal cross section of the termination 606. The termination 606 has an angled tip inside the engine 600 that minimizes back reflection inside the light guide 604 and also minimizes coupling back into the light guide 606 of radiation from the engine 600. The termination 606 includes a very hard material with good optical properties able to withstand high temperatures. The plurality of light guides 604 can connect to the solar collectors 200 in FIGS. 2-4. Additionally, the engine can include fewer light guides 604 than solar collectors 200 utilizing the mechanism 300 in FIG. 3 to combine light guides 204.

The engine 600 can include a Stirling-type engine, a Rankine-type engine, or the like. A Stirling engine is a closed-cycle regenerative heat engine with a gaseous working fluid. The Stirling engine is closed-cycle because the working fluid, i.e., the gas in a heat chamber 608 which pushes on a piston 610, is permanently contained within the engine 600. This also categorizes it as an external heat engine which means it can be driven by any convenient source of heat. "Regenerative" refers to the use of an internal heat exchanger called a 'regenerator' which increases the engine's thermal efficiency compared to the similar but simpler hot air engine.

In both FIGS. 6A and 6B, the optically transparent window 602 and the plurality of light guides 604 transfer concentrated solar energy directly into the heat chamber 608 of the engine 600. Advantageously, this direct transfer provides a lower temperature of the engine 600 and reduced thermal stress on a body 612 of the engine 600. The engine 600 can include a liner 614 made out of a material that is a reflector of infrared radiation and at the same time has poor thermal conductivity (thermal insulator). Advantageously, the liner 614 keeps heat inside the engine 600 avoiding excessive heating of the engine body. This leads to longer engine life, better reliability, increased efficiency, and the like.

The heat chamber 608 is delimited at one end by the piston 610 which moves in a reciprocating manner inside the engine 600. The efficiency of the engine 600 is improved in the present invention because the outside temperature of the hot end of the engine 600 is greatly reduced (compared to conventional designs) and therefore the radiated heat loss is decreased. Inside the heat chamber 608, the concentrated solar radiation is absorbed and the energy heats up the working fluid in the chamber. The working fluid can be a gas (typically pressurized), steam, a phase change material, or any other working fluid utilized in closed-cycle thermodynamic engines. The optically transparent window 602 can be shaped in a trapezoidal shape or the like to seal the heat chamber 608, i.e. through the pressurized gas. Alternatively, seals can be located on the optically transparent window 602 or around the plurality of light guides 604.

The heat chamber 608 includes an energy absorber and gas heater 616 which is designed to have a large surface area. The energy absorber and gas heater 616 is made out of a material that absorbs infrared radiation and can efficiently release it to the working fluid such as graphite or other type of carbon-based material, a suitable metal, a metal oxide, or the like. The energy absorber and gas heater 616 can include carbon nano particles or other nano size particles uniformly distributed and suspended in the working fluid.

The engine 600 also includes one or more heat exchangers for cooling the gas inside the heat chamber 608 at an appropriate time during the thermodynamic cycle. One or more linear generators or the like (not shown) can be coupled to a rod 618 of the pistons 610. Generally, the generators are configured to convert mechanical energy from the pistons 610 into electrical energy. The electrical energy can be distributed for use or stored for future use.

The engine 600 is shown for illustration purposes. Those of ordinary skill in the art will recognize that the dual-surface reflector 100 and the multiple solar collectors 200 can be utilized to concentrate and directly deliver solar energy into any type of engine. Of note, the present invention delivers concentrated solar energy directly into the heat chamber 608 to avoid heating the engine body.

Advantageously, the designs described herein enable distributed electrical energy generation from a few kWs to 10's of kW per unit at a low cost. The present invention can directly generate Alternating Current (AC) electricity without a need for inverters. Also, the present invention can provide heat output which can be used, for example, for space heating, water heating, air conditioning, micro desalination plants, and the like. The present invention provides low installation costs and low overall maintenance costs. Additionally, the present invention can enable a modular design, such as adding additional solar collectors as needed to scale energy generation.

Figure 7:
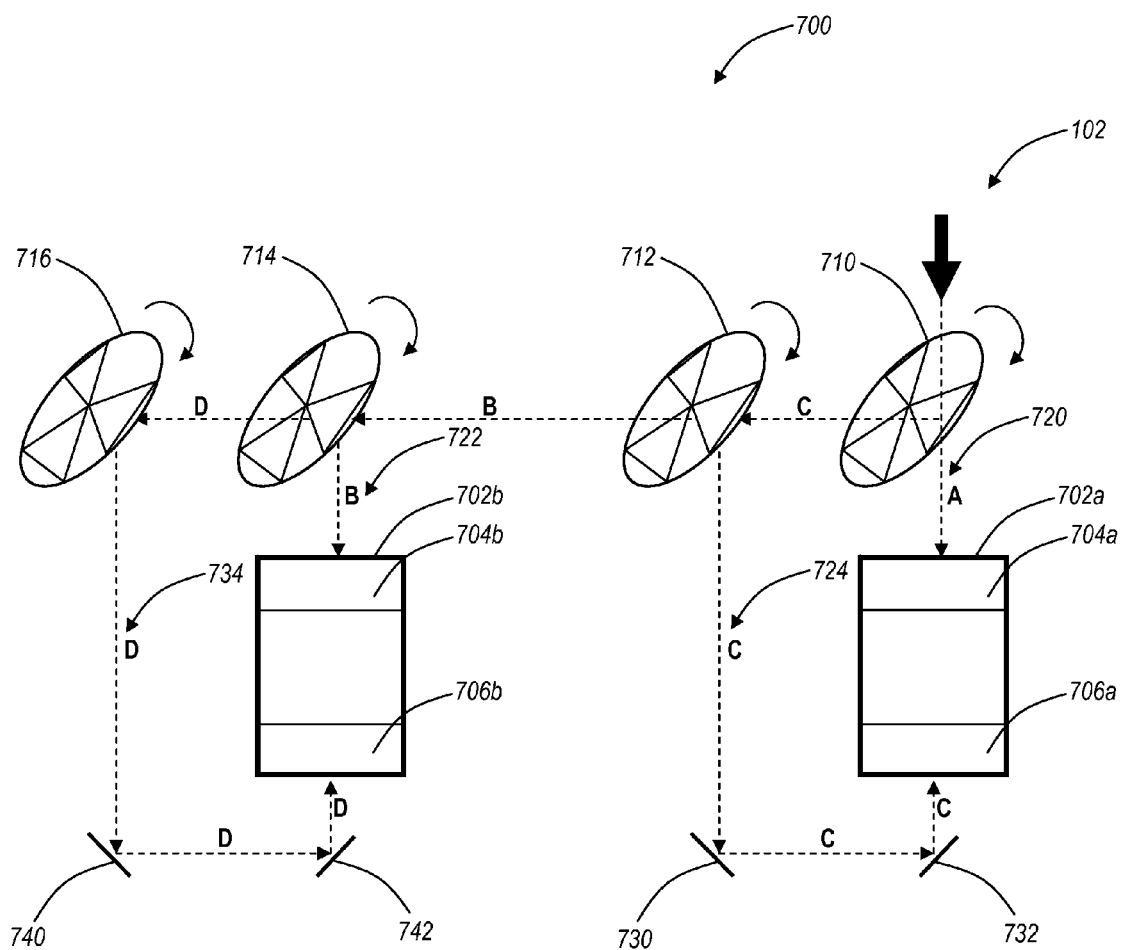
FIG. 7 is a diagram of an energy distribution and delivery system for concentrated solar energy directly into thermodynamic closed-cycle based engines and/or piezoelectric generators according to an exemplary embodiment of the present invention.

Referring to FIG. 7, an energy distribution and delivery system 700 is illustrated for concentrated solar energy that allows the release of the concentrated solar energy in a pulsating manner directly into one or more engines and/or generators according to an exemplary embodiment of the present invention. The energy distribution and delivery system 700 is illustrated with two exemplary engines/generators 702a, 702b, and those of ordinary skill in the art will recognize the energy distribution and delivery system 700 could use additional engines/generators 702 or the like.

Each of the engines/generators 702a, 702b includes a first heating chamber 704a, 704b and a second heating chamber 706a, 706b. The energy distribution and delivery system 700 is configured to maximize usage of collected solar energy 102 by distributing the solar energy 102 to each heating chamber 704a, 704b, 706a, 706b at appropriate times in their respective cycles. For example, the solar energy 102 can be collected utilizing the dual-surface reflector 100 and/or the multiple solar collectors 200 described herein.

The energy distribution and delivery system 700 includes multiple reflective disks 710, 712, 714, 716 for distributing the collected solar energy 102. Note, these reflective disks 710, 712, 714, 716 could be included within a light guide, for example. Additionally, the optical switch and splitter described herein could provide similar functionality to the reflective disks 710, 712, 714, 716. The reflective disks 710, 712, 714, 716 are configured to either reflect or pass through the collected solar energy 102. Additionally, each of the reflective disks 710, 712, 714, 716 is configured to rotate to either reflect or pass through the collected solar energy 102.

FIG. 7 illustrates an exemplary operation of the energy distribution and delivery system 700. The collected solar energy 102, during a time period 720 (following a dashed line A), passes through an opening of the first disk 710 and enters the heating chamber 704a of the engine/generator 702a. During a time period 722 (following a dashed line B), the concentrated solar energy 102 is reflected off the first disk 710, passes through the second disk 712, and reflects off the third disk 716 to enter the heating chamber 704b of the engine/generator 702b.

During a time period 724 (following a dashed line C), the concentrated solar energy 102 reflects off the first disk 710, reflects off the second disk 712, and reflects off reflectors 730, 732 to enter the heating chamber 706a of the engine/generator 702a. The reflectors 730, 732 are positioned to direct the concentrated solar energy 102, and light guides could also be utilized. During a time period 734 (following a dashed line D), the concentrated solar energy 102 reflects off the first disk 710, passes through the second disk 712 and the third disk 714, and reflects off the fourth disk 716 and reflective surfaces 740, 742 to enter the heating chamber 706b of the engine/generator 702b.

The cycle can then start all over again. The energy distribution and delivery system 700 can be used for one, two, or more generator chained in a similar fashion. The size and shape of the reflecting surfaces on each individual disk can be tailored for obtaining optimum performance. For example, the duration of the energy input in any chamber 704a, 704b, 706a, 706b can be adjusted by varying the size of the reflecting surface (or a combination of multiple reflecting surfaces) and the rotational speed of the disk 710, 712, 714, 716. The energy distribution and delivery system 700 can include motors (not shown) configured to rotate the disks 710, 712, 714, 716. The pulsating manner of energy transfer allows the solar energy to enter into the chamber of the generator periodically, for a controllable period of time, similar to turning a switch ON and OFF. Also, the energy distribution and delivery system 600 can utilize the optical splitter 308 and the optical switch 310 in a similar fashion as the reflective disks 710, 712, 714, 716 to distribute the solar energy 102.

Figure 8:
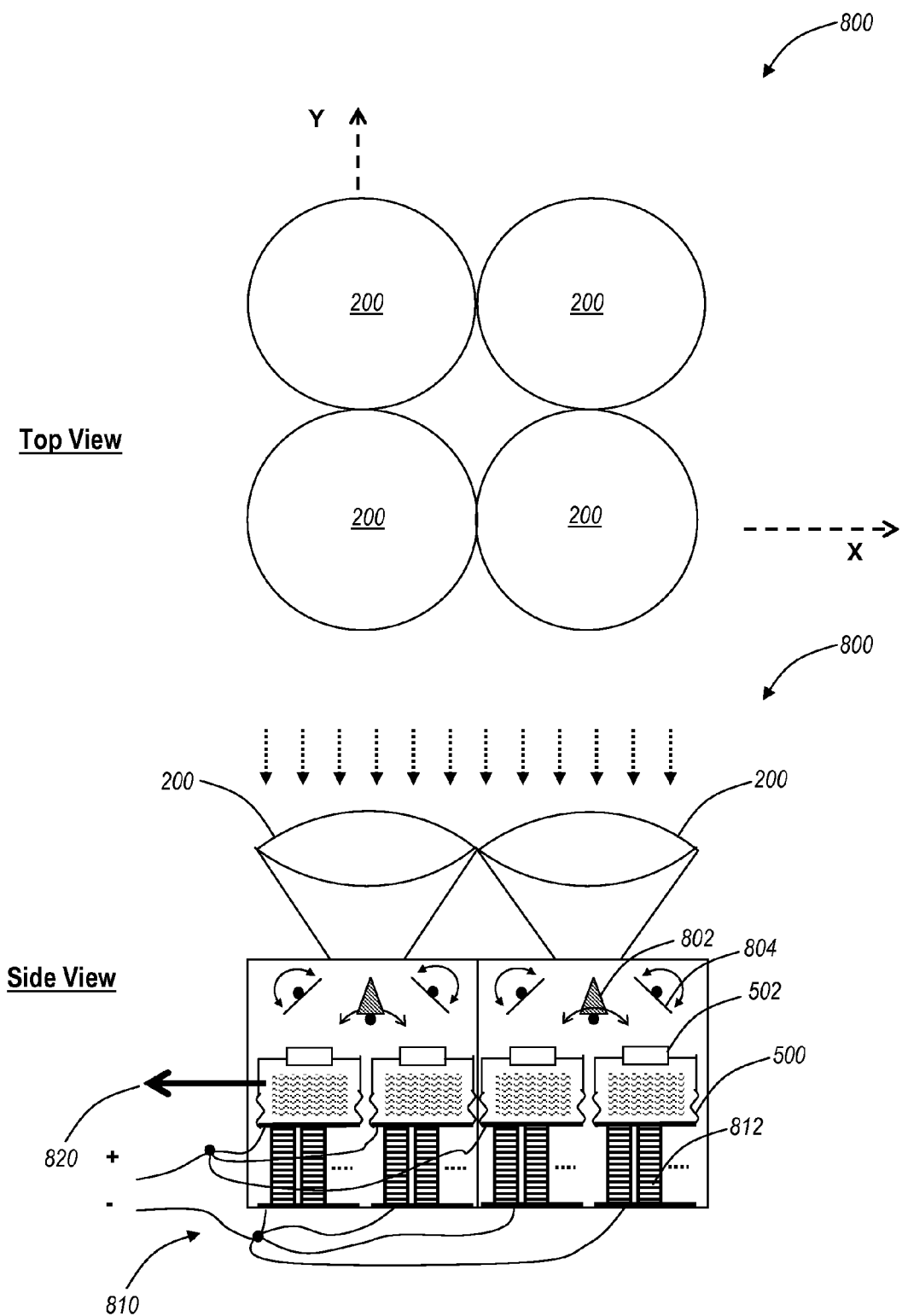
FIGS. 8 and 9 are diagrams of a solar array utilizing optical switches and reflective surfaces with the solar collectors of FIG. 2 according to an exemplary embodiment of the present invention.
Figure 9:
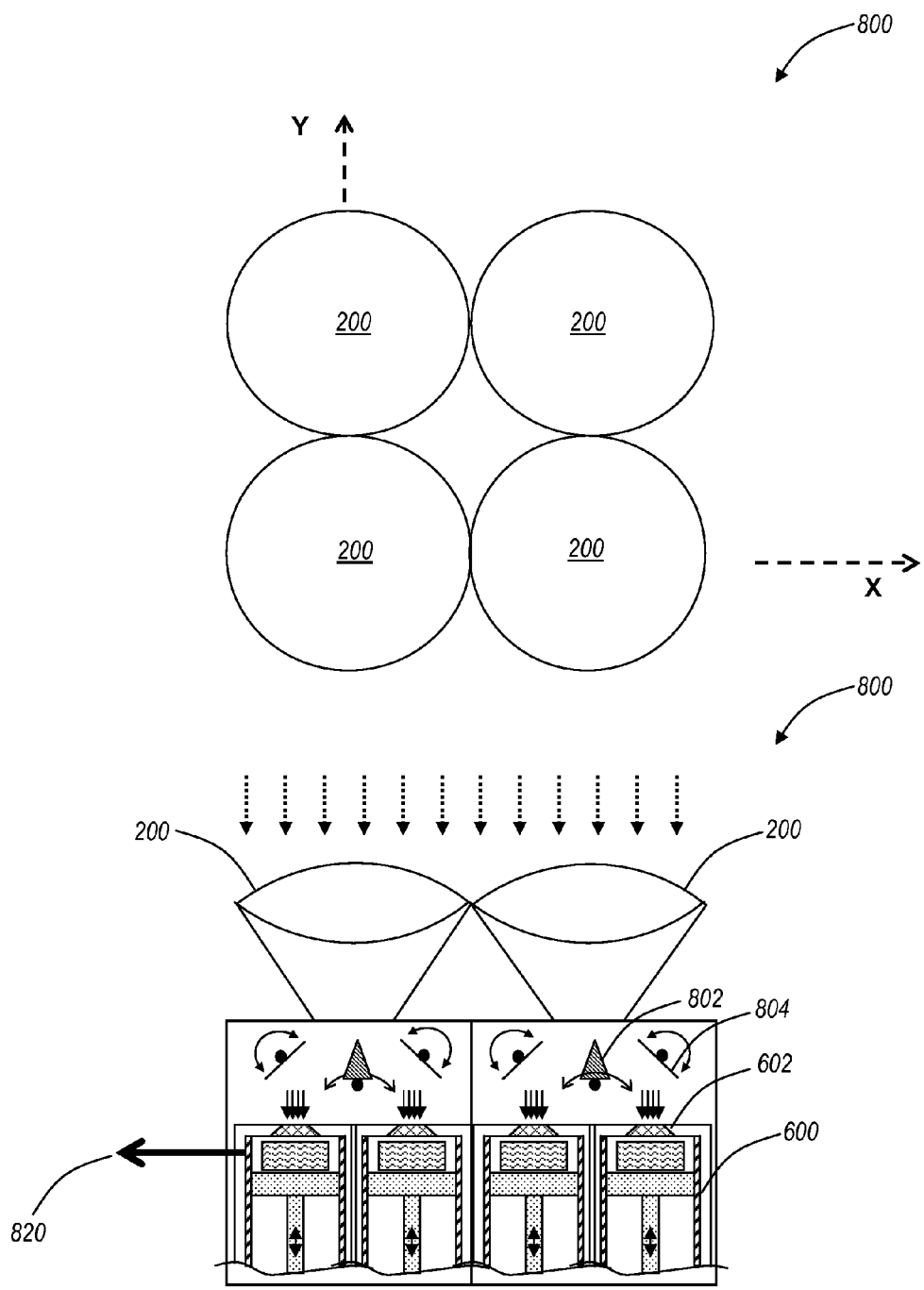

Referring to FIGS. 8 and 9, a solar array 800 is illustrated in a schematic top and cross-sectional view according to an exemplary embodiment of the present invention. As illustrated in the top view, the solar array 800 includes a plurality of solar collectors 200 such as described herein. The present invention utilizes various distribution mechanisms to distribute collected solar energy from the solar collectors 200 to multiple engines/generators. Specifically, these mechanisms enable more engine/generators than corresponding solar collectors 200. Advantageously, the solar array 800 utilizes these distribution mechanisms to more efficiently use collected solar energy.

The solar array 800 includes multiple generators 500 (FIG. 8) or engines 600 (FIG. 9). Those of ordinary skill in the art will recognize that the solar array 800 can be utilized with any device adapted to receive concentrated solar radiation. The solar array 800 directs concentrated solar energy through free space to enter the generator 500 or engine 600 through an optically transparent window 502, 602.

In the examples of FIGS. 8 and 9, the solar array 800 includes four solar collectors 200 with each solar collector 200 providing concentrated solar energy to two generators/engines 500, 600. Each solar collector 200 directs concentrated solar energy in free space to an optical switch 802. The optical switch 802 is configured to direct the concentrated solar energy to a reflective surface 804. The optical switch 802 can include oscillating (vibrating) reflective surface or surfaces (such as MEMS), or a refractive switch. The reflective surfaces 804 can be fixed with a flat or curved surface (such that to minimize the loss of solar energy during the transient part of the switch 802 movement) or can move in sync with the optical switch 802 in such a way to minimize the loss of solar energy during the transient part of the switch movement. Other designs, such as based on refractive optical elements, are possible that distribute the light to the desired locations. In this example, there are two reflective surfaces 804, one for each generator/engine 500, 600. The present invention contemplates additional reflective surfaces 804 as required for additional generators/engines 500, 600.

Both the optical switch 802 and the reflective surfaces 804 are configured to rotate to enable concentrated solar energy to be transferred in a pulsating manner directly into the working fluid inside the chamber of the generator/engine 500, 600. The pulsating manner of energy transfer means that the solar energy is allowed to enter into the chamber of the generator/engine 500, 600 periodically, for a predetermined period of time, similar to turning a switch ON and OFF. When a particular engine 600 or generator 500 is in the OFF period, the solar energy is directed into the next engine 600 or generator 500 (of the same solar collector 200) and so on in a cyclical fashion. In this way, almost all the energy from the solar collector 200 is utilized.

Clearly, multiple (more than three) closed-cycle thermodynamic engines 600 and piezo-electric generators 500 can be made to belong to the same solar array 800 and correspond to the same solar collector 200. For example in FIG. 8, an output 810 of the generators 600 from multiple cells can be connected in series, in parallel, or a combination of series and parallel connections in order to optimize the desired overall output. The output 810 of the generators 600 can also be connected in configurations that result in single phase, two phases, or three phases overall outputs. The output 810 is connected to plates at the end of piezo-electric stacks 812. The cyclical distribution of solar energy into multiple engine-generator combination can be made to match the desired number of output phases. Multiple phase outputs can be generated either from phase shifting outputs from multiple groups of cells, or by having multiple phases coming out of each cell (from multiple generators).

During the OFF period of a particular generator/engine 500, 600, heat 820 is removed from the working fluid of that generator/engine 500, 600 as part of the thermodynamic cycle, such as the heat exchange mechanisms described herein in FIGS. 5 and 6. An advantage of pulsating the energy is that solar energy is added to the working fluid in a controlled manner only at the desired time and for the desired duration. That also allows for a dynamic control scheme of the output power (switches can reconfigure the connection among the outputs from individual generators/engines 500, 600) for cases when solar energy varies (such as due to clouds). In this way, the output power can change while the voltage and the AC current frequency can stay essentially constant.

Figure 10:
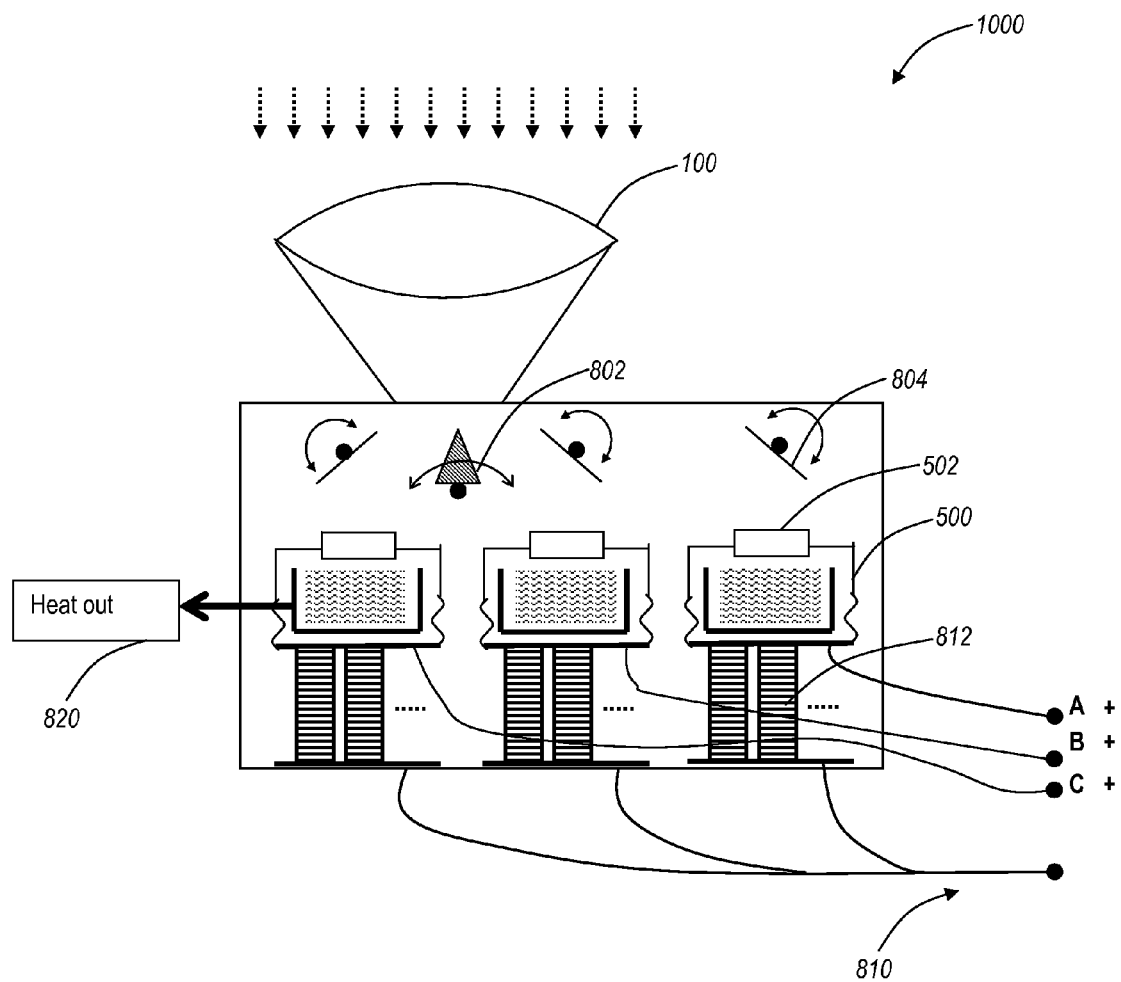
FIGS. 10 and 11 are diagrams of a solar array utilizing optical switches and reflective surfaces with the dual-surface reflector of FIG. 1 according to an exemplary embodiment of the present invention.
Figure 11:
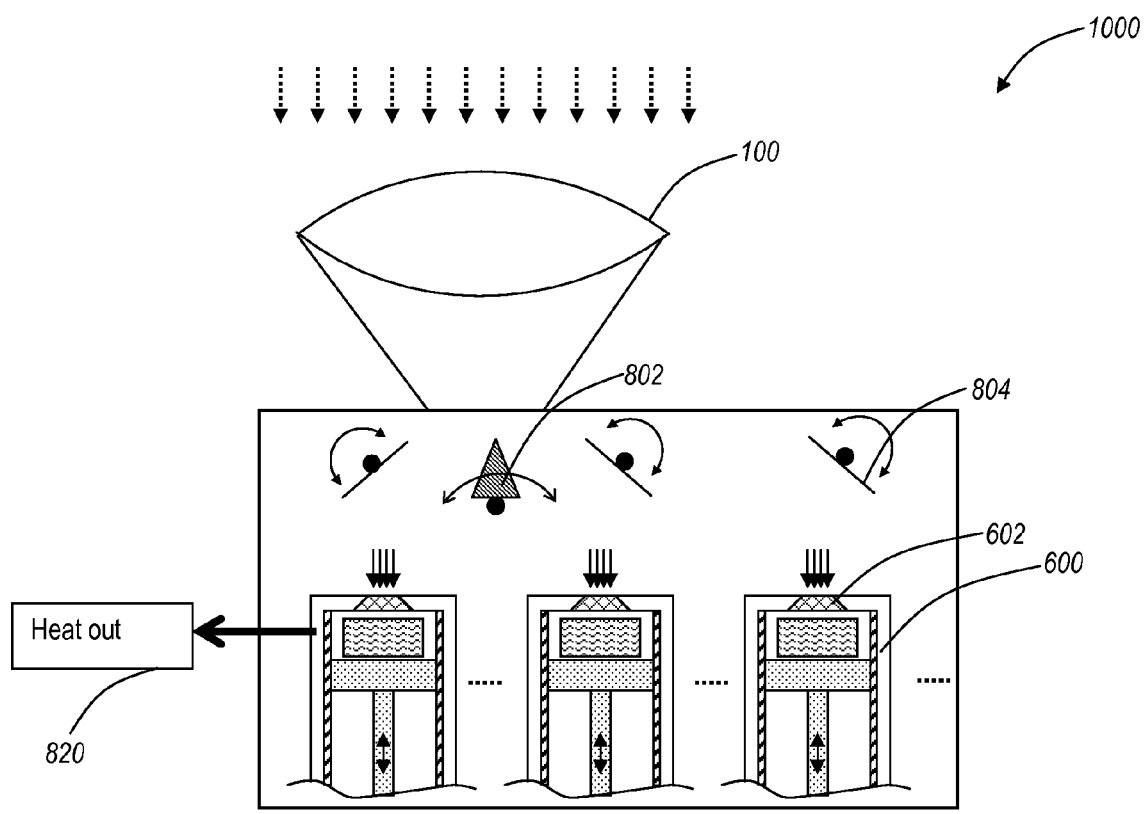

Referring to FIGS. 10 and 11, a solar array 1000 is illustrated in a schematic cross-sectional view according to an exemplary embodiment of the present invention. The solar array 1000 includes a dual-surface reflector 100 or the like configured to collect and concentrate solar energy. The solar array 1000 utilizes similar distribution mechanisms as described in FIGS. 8 and 9 to distribute collected solar energy from the dual-surface reflector 100 to multiple generators/engines 500, 600 thereby enabling more efficient use of collected solar energy. Specifically, these mechanisms enable multiple engine/generators 500, 600 for the corresponding dual-surface reflector 100. Advantageously, the solar array 1000 utilizes these distribution mechanisms to more efficiently use collected solar energy. FIG. 10 illustrates the solar array 1000 with multiple piezoelectric generators 500, and FIG. 11 illustrates the solar array 1000 with multiple closed-cycle thermodynamic based engines 600.

Referring to FIGS. 12-15, solar arrays 1200, 1400 are illustrated in various schematic views according to an exemplary embodiment of the present invention. Each of the solar arrays 1200, 1400 utilize light guides 504, 604 with terminations 506, 606 directly in heating chambers of the generators 500 and engines 600. The light guides 504, 604 are used to direct the collected solar energy in lieu of free space transmission with optical switches and reflective surfaces. Specifically, the solar arrays 1200, 1400 utilize the distribution mechanism 300 described herein in FIG. 3.

Figure 12:
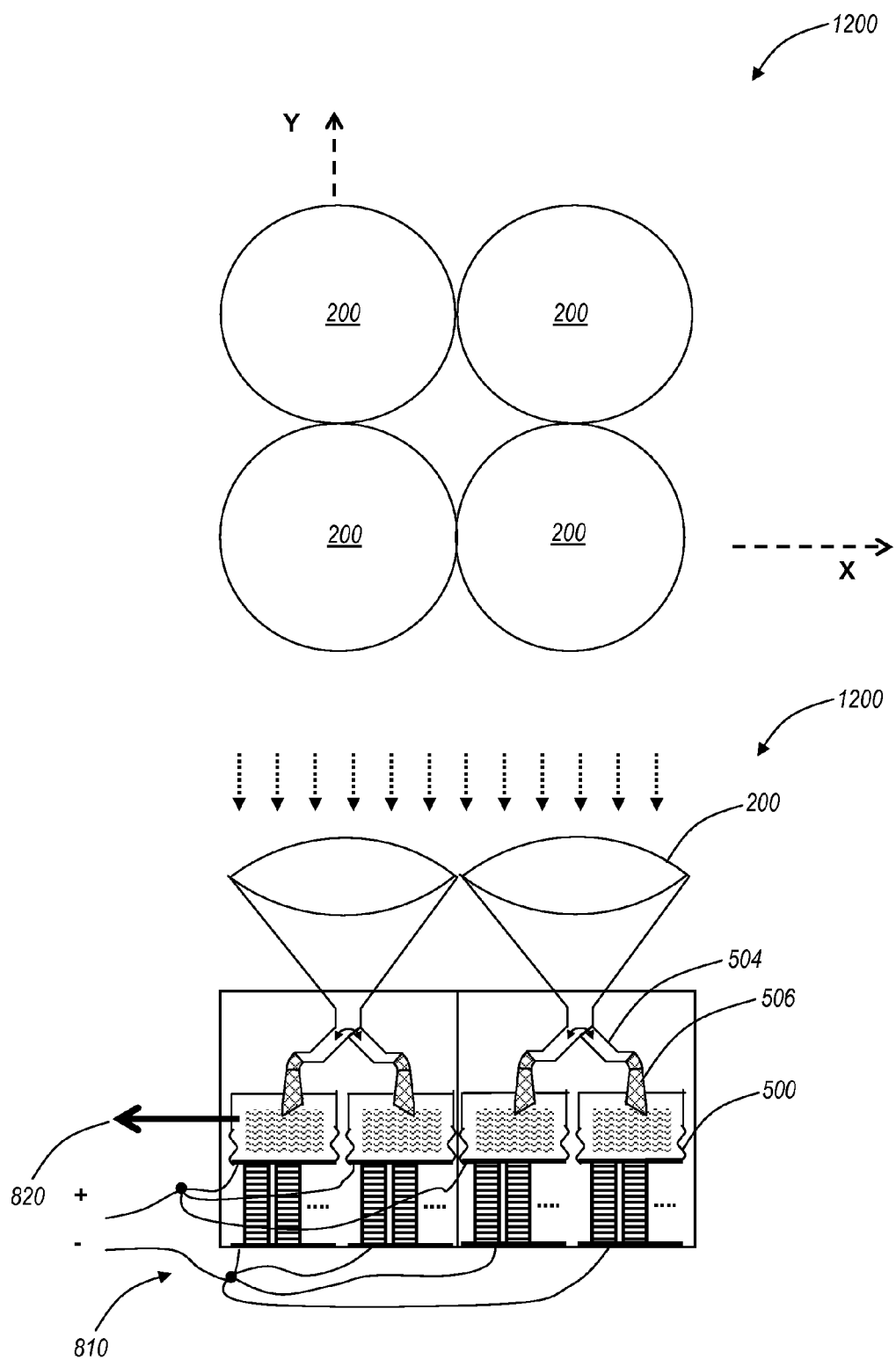
FIGS. 12-15 are diagrams of solar arrays utilizing the distribution mechanism of FIG. 3 with the solar collectors of FIG. 2 and the dual-surface reflector of FIG. 1 according to an exemplary embodiment of the present invention.
Figure 13:
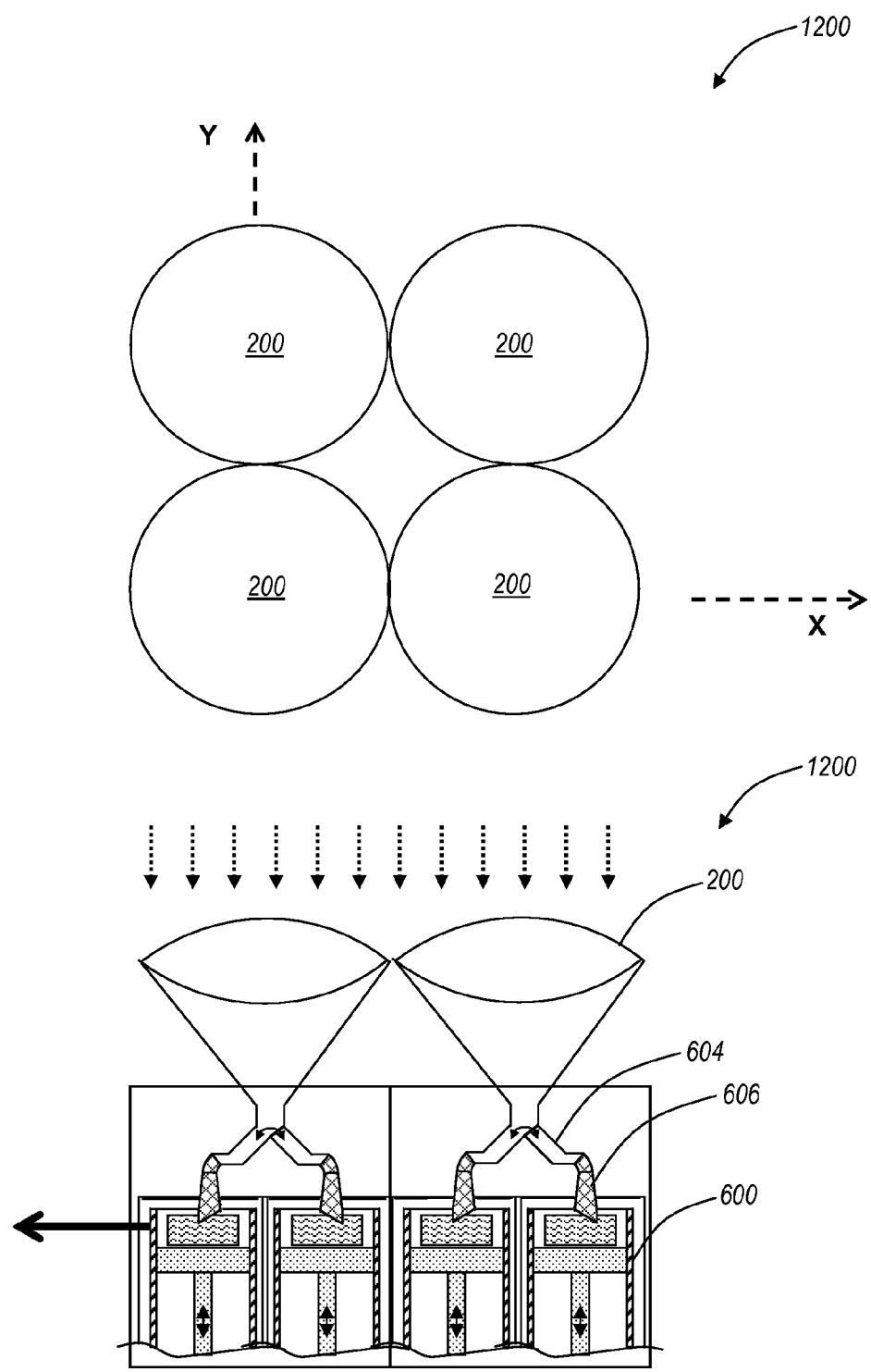

FIG. 12 illustrates the solar array 1200 with multiple piezoelectric generators 500 adapted to receive collected solar energy from multiple solar collectors 200. In this example, there are two generators 500 for each solar collector 200. Accordingly, the light guide 504 includes a single switch 310 operable to split the light guide 504 into two directions into separate terminations 506 in each generator 500. Those of ordinary skill in the art will recognize that each solar collector 200 could serve more than two generators 500 with the addition of splitters and optical switches. FIG. 13 illustrates the solar array 1200 with multiple closed-cycle thermodynamic engines 600 in a similar configuration.

Figure 14:
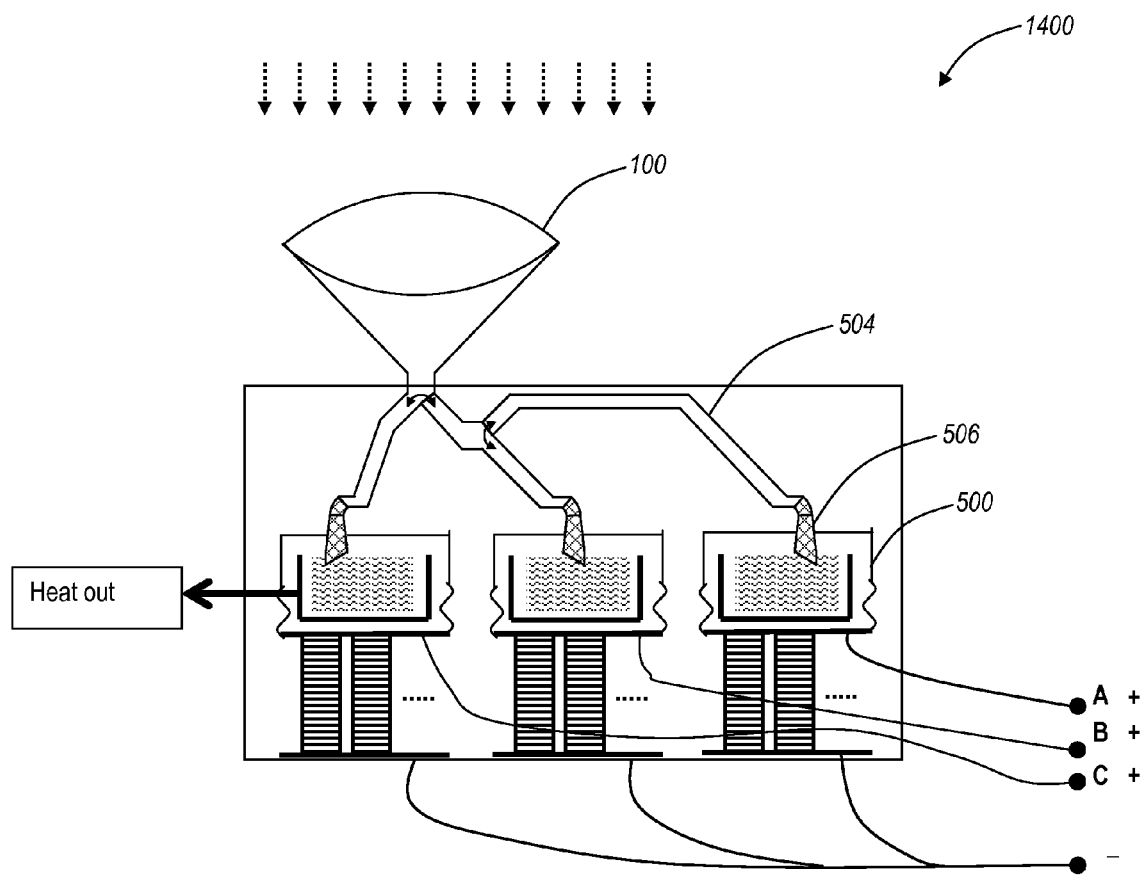
Figure 15:
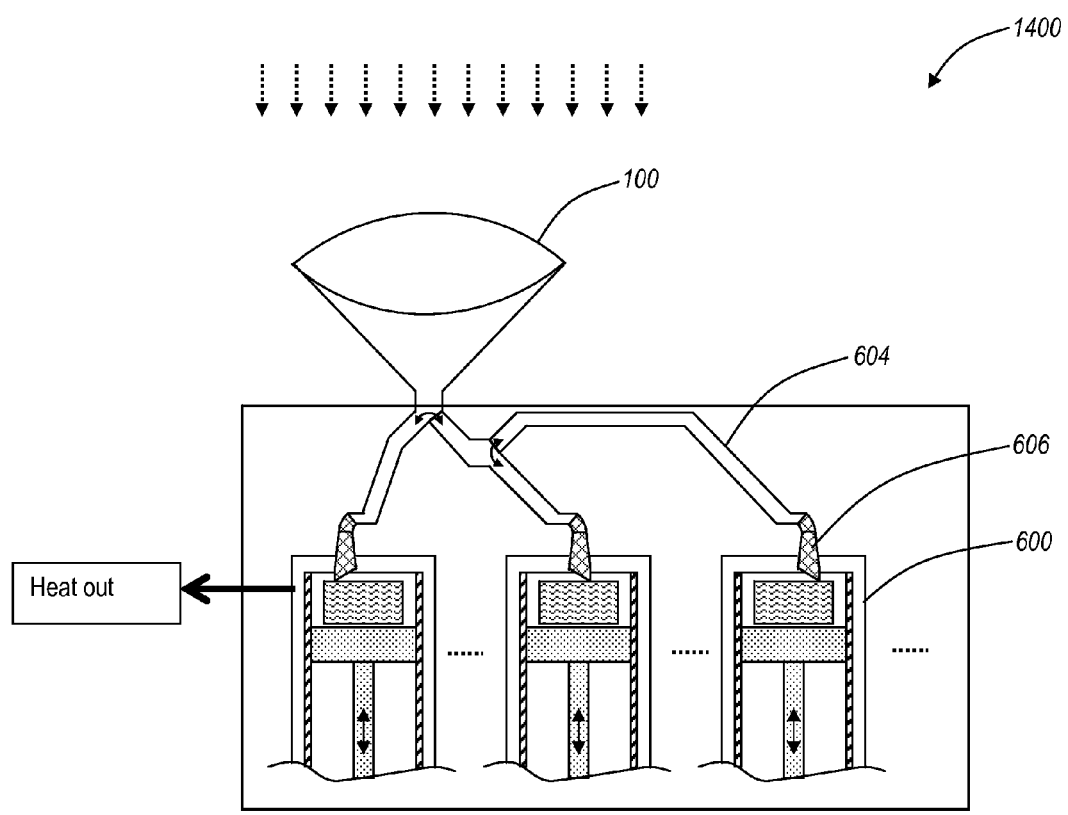

FIG. 14 illustrates the solar array 1400 with multiple piezoelectric generators 500 adapted to receive collected solar energy from a dual-surface reflector 100. In this example, there are three generators 500 for the single dual-surface reflector 100. Accordingly, the light guide 504 includes two optical switches 310, i.e. two switches enable two branches in the light guides 504 to allow a total of three terminations 506. Thus, the solar array 1400 provides three generators 500 for one dual-surface reflector 100. The present invention contemplates additional generators 500 with more splitters and optical switches. FIG. 15 illustrates the solar array 1400 with multiple closed-cycle thermodynamic engines 600 in a similar configuration.

Figure 16:
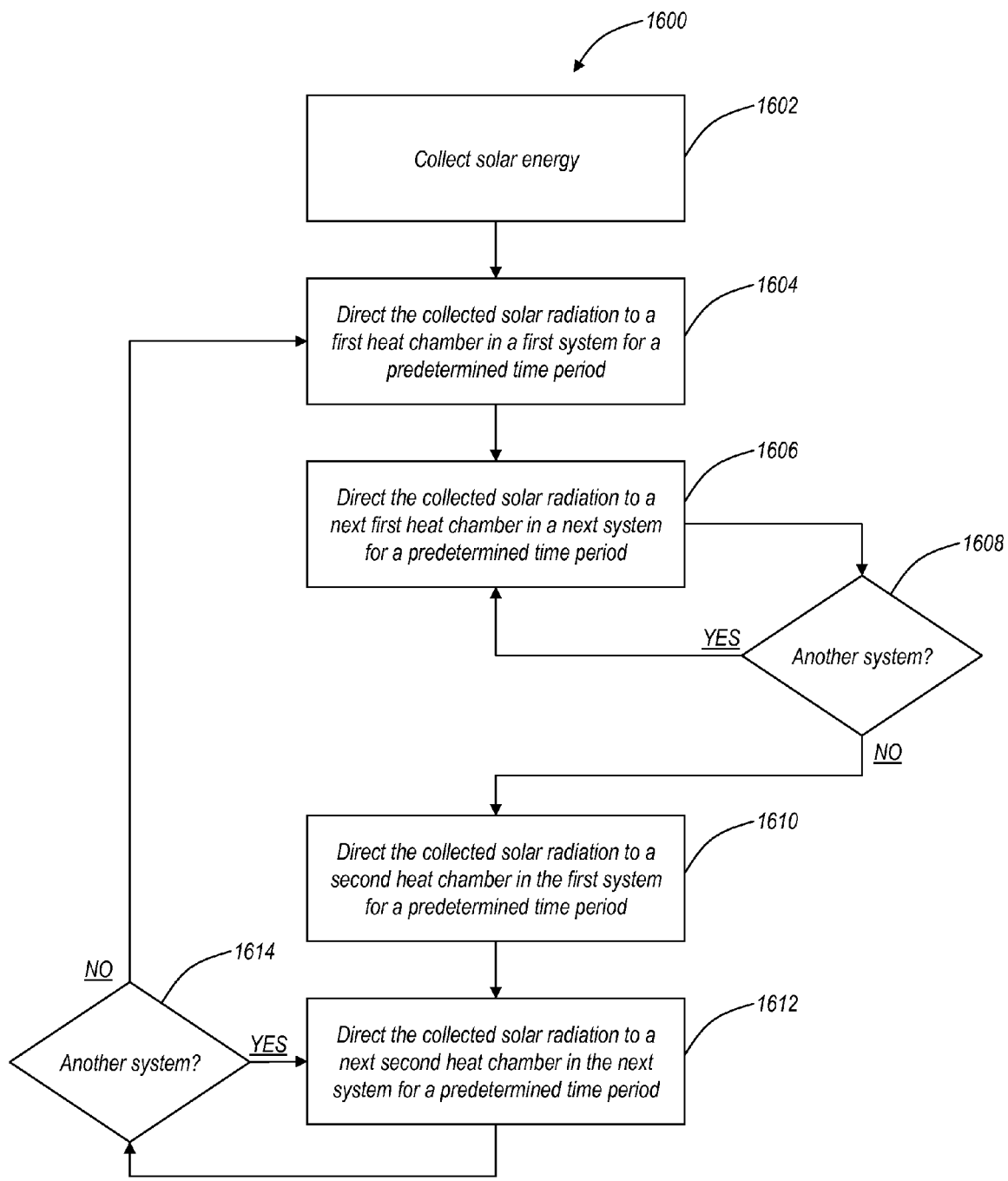
FIG. 16 is a flowchart of an energy distribution and delivery mechanism for concentrating and releasing solar energy in a pulsating manner directly into multiple systems according to an exemplary embodiment of the present invention.

Referring to FIG. 16, a flowchart illustrates an energy distribution and delivery mechanism 1600 for concentrating and releasing solar energy in a pulsating manner directly into multiple systems according to an exemplary embodiment of the present invention. As described herein, each system can include a piezo-electric generator, a closed-cycle thermodynamic engine, or the like. The distribution and delivery mechanism 1600 collects solar energy (step 1602). The collection step can include the mechanisms described herein with respect to the dual-surface reflector 100 and/or the multiple solar collectors 200.

Next, the distribution and delivery mechanism 1600 directs the collected solar energy to a first heat chamber in a first system for a predetermined time period (step 1604). The predetermined time period can correspond to a heating cycle for the first system. After the predetermined time period, the collected solar energy is directed to a next first heat chamber in a next system for another predetermined time period (step 1606).

The distribution and delivery mechanism 1600 checks if there is another system (step 1608). Here, the distribution and delivery mechanism 1600 is configured to cycle through all of the system to provide collected solar energy into the associated first heat chambers of each system. If there is another system, the distribution and delivery mechanism 1600 returns to step 1606.

If not, the distribution and delivery mechanism 1600 directs the collected solar energy to a second heat chamber in the first system for a predetermined time period (step 1610). Then, the distribution and delivery mechanism 1600 directs the collected solar energy to a next second heat chamber in the next system for a predetermined time period (step 1612).

The distribution and delivery mechanism 1600 checks if there is another system (step 1614). Here, the distribution and delivery mechanism 1600 is configured to cycle through all of the systems to provide collected solar energy into the associated second heat chambers of each system. If there is another system, the distribution and delivery mechanism 1600 returns to step 1616. If not, the distribution and delivery mechanism 1600 can return to step 1604 for another cycle through each of the heat chambers.

Figure 17:
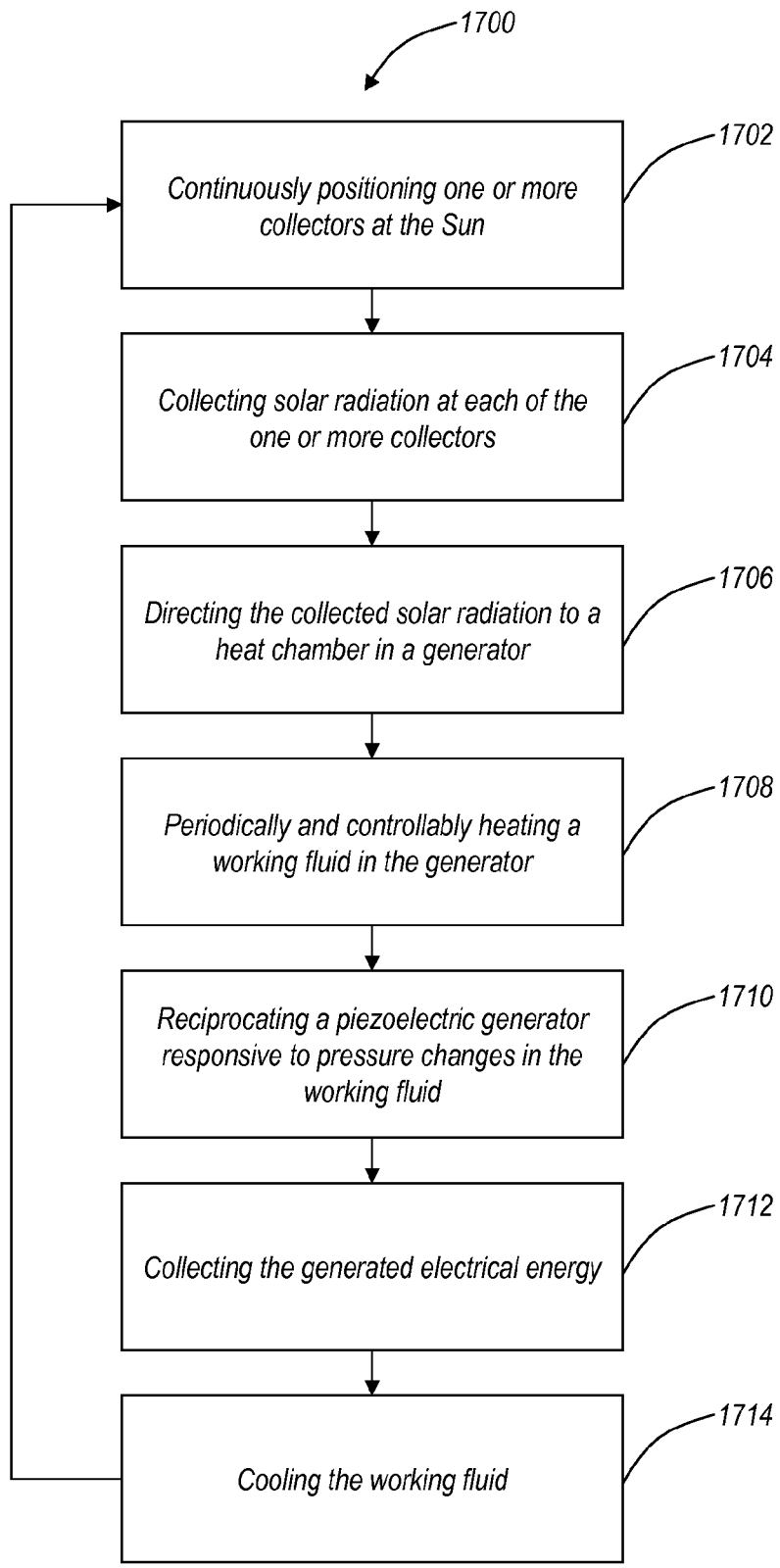
FIG. 17 is a flowchart of a mechanism to convert solar energy into electric energy according to an exemplary embodiment of the present invention.

Referring to FIG. 17, a flow chart illustrates a mechanism 1700 to convert solar energy into electric energy according to an exemplary embodiment of the present invention. The mechanism 1700 includes: continuously positioning one or more solar collectors towards the sun (step 1702); collecting solar radiation at each of the one or more solar collectors (step 1704); directing the collected solar radiation to a heat chamber in a generator or an engine (step 1706); periodically and controllably heating a working fluid in the generator with the directed solar radiation (step 1708); reciprocating a piezo-electric generator or a closed-cycle thermodynamic engine responsive to pressure changes in the working fluid (step 1710); collecting the generated electrical energy (step 1712); cooling the working fluid (step 1714), and repeating the mechanism 1700.

Figure 18:
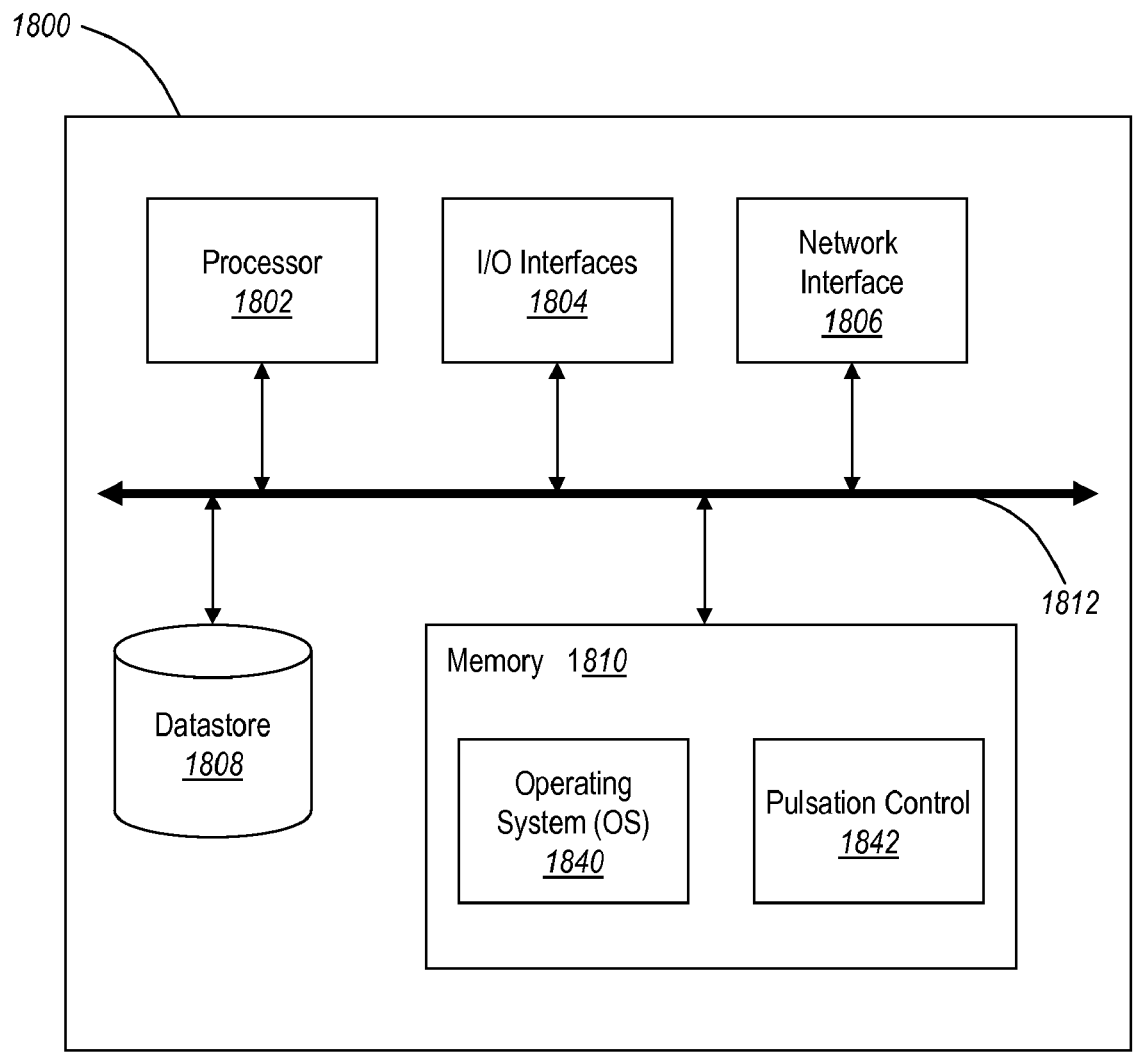
FIG. 18 is a block diagram of a controller for controlling the pulsating manner of solar energy distribution.

Referring to FIG. 18, a block diagram illustrates a controller 1800 for controlling the pulsating manner of solar energy distribution according to an exemplary embodiment of the present invention. The controller 1800 can be a digital computer that, in terms of hardware architecture, generally includes a processor 1802, input/output (I/O) interfaces 1804, network interfaces 1806, a data store 1808, and memory 1810. The components (1802, 1804, 1806, 1808, and 1810) are communicatively coupled via a local interface 1812. The local interface 1812 can be, for example but not limited to, one or more buses or other wired or wireless connections, as is known in the art. The local interface 1812 can have additional elements, which are omitted for simplicity, such as controllers, buffers (caches), drivers, repeaters, and receivers, among many others, to enable communications. Further, the local interface 1812 can include address, control, and/or data connections to enable appropriate communications among the aforementioned components.

The processor 1802 is a hardware device for executing software instructions. The processor 1802 can be any custom made or commercially available processor, a central processing unit (CPU), an auxiliary processor among several processors associated with the controller 1800, a semiconductor-based microprocessor (in the form of a microchip or chip set), or generally any device for executing software instructions. When the controller 1800 is in operation, the processor 1802 is configured to execute software stored within the memory 1810, to communicate data to and from the memory 1810, and to generally control operations of the controller 1800 pursuant to the software instructions.

The I/O interfaces 1804 can be used to receive user input from and/or for providing system output to one or more devices or components. User input can be provided via, for example, a keyboard and/or a mouse. System output can be provided via a display device and a printer (not shown). I/O interfaces 1804 can include, for example, a serial port, a parallel port, a small computer system interface (SCSI), an infrared (IR) interface, a radio frequency (RF) interface, and/or a universal serial bus (USB) interface.

The network interfaces 1806 can be used to enable the controller 1800 to communicate on a network, such as to a client or the like. The network interfaces 1806 can include, for example, an Ethernet card (e.g., 10BaseT, Fast Ethernet, Gigabit Ethernet) or a wireless local area network (WLAN) card (e.g., 802.11a/b/g/n). The network interfaces 8106 can include address, control, and/or data connections to enable appropriate communications on the network.

A data store 1808 can be used to store data, such as configuration data and the like. The data store 1808 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1808 can incorporate electronic, magnetic, optical, and/or other types of storage media. In one example, the data store 1808 can be located internal to the controller 1800 such as, for example, an internal hard drive connected to the local interface 1812 in the controller 1800.

The memory 1810 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1810 may incorporate electronic, magnetic, optical, and/or other types of storage media. Note that the memory 1810 can have a distributed architecture, where various components are situated remotely from one another, but can be accessed by the processor 1802.

The software in memory 1810 can include one or more software programs, each of which includes an ordered listing of executable instructions for implementing logical functions. In the example of FIG. 18, the software in the memory system 1810 includes a suitable operating system (O/S) 1840 and a pulsation control program 1842. The operating system 1840 essentially controls the execution of other computer programs, such as the pulsation control program 1842, and provides scheduling, input-output control, file and data management, memory management, and communication control and related services. The operating system 1840 can be any of Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or the like.

The pulsation control program 1842 is configured to control the various distribution mechanisms described herein to enable distribution of collected solar energy from one or more solar collectors to multiple engines/generators in a pulsating manner. Specifically, the controller 1800 can be internal or external to the various devices described herein. The controller 1800 is communicatively coupled, such as through the network interface 1806 or I/O interfaces 1804, to the optical switches, splitters, reflective surfaces, etc. The pulsation control program 1842 is configured to control these devices to distribute energy as required to the multiple engines/generators. For example, the pulsation control program 1842 can perform the distribution based on preconfigured settings or based upon adaptive settings using feedback to determine optimal heating cycle lengths for each engine/generator. The engines/generators and solar collectors can further include embedded sensors which report operational data to the controller 1800. This operational data can be utilized in the adaptive settings to provide optimal energy generation.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A solar array distribution system, comprising:
   a solar energy collector;
   a distribution mechanism located at an output of the solar collector; and
   a controller communicatively coupled to the distribution mechanism, wherein the controller is configured to control the distribution mechanism to provide collected solar energy from the solar energy collector to two or more devices in a pulsating manner;
   wherein the distribution mechanism comprises:
   a plurality of light guides connected to the output of the solar collector; one or more splitters in the plurality of light guides; and
   a termination on each of the plurality of light guides, wherein the termination is located in a heating chamber of each of the two or more devices.

2. The solar array distribution system of claim 1, wherein the pulsating manner comprises providing the collected solar energy into each of the two or more devices for a time period corresponding to a heating cycle for the each of the two or more devices.

3. The solar array distribution system of claim 2, wherein the time period comprises one of a predetermined value and an adaptive setting based on operational conditions associated with the solar energy collector and the two or more devices.

4. The solar array distribution system of claim 1, wherein the distribution mechanism comprises:
   an optical switch located in free space at an output of the solar energy collector; and
   two or more reflective surfaces located in free space, wherein each of the two or more reflective surfaces is positioned substantially adjacent to each of the two or more devices;
   wherein the controller is configured to control the optical switch and the two or more reflective surfaces to provide the collected solar energy through optically transparent windows on each of the two or more devices.

5. The solar array distribution system of claim 4, wherein the optical switch comprises one of an oscillating reflective surface, a microelectromechanical system, and a refractive switch, and wherein the two or more reflective surfaces each comprise one of a flat and a curved surface configured to move with the optical switch to minimize the loss of solar energy during the transient part of the optical switch movement.

6. The solar array distribution system of claim 1, wherein the plurality of light guides comprise any of FEP, glass, fluorinated polymers, and a thin tube filled with a fluid; and
   wherein the termination comprises a material transparent to infrared radiation and resistant to high temperatures inside the heating chamber.

7. The solar array distribution system of claim 1, wherein the distribution mechanism comprises:
   a plurality of rotatable reflective disks each comprising a reflective portion and a pass through portion;
   wherein the distribution mechanism is configured to rotate the plurality of rotatable reflective disks to distribute the collected solar energy into each of the two or more devices.

8. The solar array distribution system of claim 2, wherein the two or more devices each comprise any of a generator and a thermodynamic engine;
   wherein each of the two or more devices comprise an offset heating cycle from the other two or more devices.

9. The solar array distribution system of claim 8, wherein the pulsating manner further comprises removing heat with a heat removing device from each of the heating chambers not receiving collected solar energy through the distribution mechanism.

10. The solar array distribution system of claim 9, wherein the two or more devices comprise a piezoelectric generator;
    wherein the heat removing device comprises a plurality of heat exchangers disposed around the heating chamber; and
    wherein the plurality of heat exchanges comprise tubes with cooling water.

11. The solar array distribution system of claim 9, wherein the two or more devices comprise a closed-cycle thermodynamic; and
    wherein the heat removing device comprises a plurality of heat exchangers disposed around the heating chamber.

12. A solar array, comprising:
    a plurality of solar collectors;
    an optical switch located in free space at an output of each of the plurality of solar collectors;
    two or more reflective surfaces located in free space, wherein each of the two or more reflective surfaces is positioned substantially adjacent to two or more devices; and
    a controller communicatively coupled to the optical switch and the two or more reflective surfaces, wherein the controller is configured to control the optical switch and the two or more reflective surfaces to provide collected solar energy from the plurality of solar collectors to the two or more devices in a pulsating manner.

13. The solar array of claim 12, wherein the pulsating manner comprises providing the collected solar energy into each of the two or more devices for a time period corresponding to a heating cycle for the each of the two or more devices.

14. The solar array of claim 13, wherein the time period comprises one of a predetermined value and an adaptive setting based on operational conditions associated with the solar energy collector and the two or more devices.

15. The solar array of claim 13, wherein the two or more devices each comprise a piezoelectric generator.

16. A solar array distribution system, comprising:
    a solar energy collector;
    a distribution mechanism located at an output of the solar collector; and
    a controller communicatively coupled to the distribution mechanism, wherein the controller is configured to control the distribution mechanism to provide collected solar energy from the solar energy collector to two or more devices in a pulsating manner;
    wherein the distribution mechanism comprises:
    a plurality of rotatable reflective disks each comprising a reflective portion and a pass through portion;
    wherein the distribution mechanism is configured to rotate the plurality of rotatable reflective disks to distribute the collected solar energy into each of the two or more devices.

17. The solar array distribution system of claim 16, wherein the pulsating manner comprises providing the collected solar energy into each of the two or more devices for a time period corresponding to a heating cycle for the each of the two or more devices.

18. The solar array distribution system of claim 17, wherein the time period comprises one of a predetermined value and an adaptive setting based on operational conditions associated with the solar energy collector and the two or more devices.

19. The solar array distribution system of claim 17, wherein the two or more devices each comprise any of a generator and a thermodynamic engine;
    wherein each of the two or more devices comprise an offset heating cycle from the other two or more devices.

20. The solar array distribution system of claim 19, wherein the pulsating manner further comprises removing heat with a heat removing device from each of the heating chambers not receiving collected solar energy through the distribution mechanism.

* * * * *